US008355998B1

(12) United States Patent
Averbuch et al.

(10) Patent No.: US 8,355,998 B1
(45) Date of Patent: Jan. 15, 2013

(54) CLUSTERING AND CLASSIFICATION VIA LOCALIZED DIFFUSION FOLDERS

(76) Inventors: Amir Averbuch, Jaffa (IL); Ronald R. Coifman, North Haven, CT (US); Gil David, Shoresh (IL)

( * ) Notice: Subject to any disclaimer, the term of this patent is extended or adjusted under 35 U.S.C. 154(b) by 404 days.

(21) Appl. No.: 12/708,293

(22) Filed: Feb. 18, 2010

Related U.S. Application Data

(60) Provisional application No. 61/153,649, filed on Feb. 19, 2009.

(51) Int. Cl.
G06F 17/30 (2006.01)
(52) U.S. Cl. ........................................................ 706/12
(58) Field of Classification Search ............... 706/12
See application file for complete search history.

(56) References Cited

U.S. PATENT DOCUMENTS

| 7,590,291 B2 | 9/2009 | Bradski |
| 7,627,542 B2 | 12/2009 | Tantrum |
| 2006/0004753 A1 | 1/2006 | Coifman |

OTHER PUBLICATIONS

U.S. Appl. No. 12/388,371, Feb. 2, 2009, Averbuch.
S.C. Johnson, Hierarchical Clustering Systems, Journal Psychometrika, 1967, 241-254, vol. 32, No. 3.
R.R. Coifman, S. Lafon, Diffusion Maps, Journal Applied and Computational Harmonic Analysis, 2006, 5-30, vol. 21.

*Primary Examiner* — Jeffrey A Gaffin
*Assistant Examiner* — Ola Olude-Afolabi
(74) *Attorney, Agent, or Firm* — Nathan & Associates Patent Agents Ltd.; Menachem Nathan

(57) ABSTRACT

A method for hierarchical clustering comprises multi-level partitioning of data points into non-overlapping LDFs and formation of sets of such LDFs, wherein original data points may reside in different LDFs. The sets of LDFs are then hierarchically processed into sets of super-LDFs, which are further processed up the hierarchy. In some embodiments, the further processing ends with the construction of a single super-LDF at the root of the hierarchy. The partitioning of the data points and the hierarchical processing of the sets of LDFs and super-LDFs uses respective local affinity matrices.

19 Claims, 22 Drawing Sheets

(a) (b) (c)

(d) (e) (f)

(a) (b) (c)

CLUSTERING AND CLASSIFICATION VIA LOCALIZED DIFFUSION FOLDERS

CROSS REFERENCE TO RELATED APPLICATIONS

This application claims the benefit of U.S. provisional patent application No. 61/153,649 filed Feb. 19, 2009, which is incorporated herein by reference in its entirety.

FIELD OF THE INVENTION

The invention relates in general to automatic classification of data points in a multi-dimensional data stream into clusters. More specifically, the invention relates to hierarchical classification using diffusion maps.

BACKGROUND OF THE INVENTION

As commonly understood, "data" refers to a collection of organized information, the result of experience, observation or experiment, to other information within a computer system, to a set of premises that may consist of numbers, characters or images, or to measurements of observations. Its use and properties are described in detail in U.S. patent application Ser. No. 12/388,371, "Classification and Recognition via Diffusion and Anomaly Processing" by Amir Averbuch, Ronald R. Coifman and Gil David, which is incorporated herein by reference in its entirety. Also described and defined therein are terms used in this invention such as "diffusion maps", "affinity matrix" and "distance metric".

In many cases, the data is high-dimensional (also called multi-dimensional), with a data dimension N>3. Multi-dimensional data is a collection of data points. A "data point" (also referred to herein as "sample", "sampled data", "point", "vector of observations" and "vector of measurements") is one unit of data of the original ("source" or "raw") multi-dimensional data. A data point may be expressed by Boolean, numeric values and characters, or combinations thereof. If source data is described for example by 25 measured parameters (also referred to as "features") which are sampled (recorded, measured) in a predetermined time interval (e.g. every minute), then the data is of dimension N=25. In this case, each data point is a vector of dimension 25.

In this description, the term "feature" refers to an individual measurable property of phenomena being observed. A feature is usually numeric, but may also be structural, for example a string. "Feature" is also normally used to denote a piece of information which is relevant for solving the computational task related to a certain application. "Feature" may also refer to a specific structure, ranging from a simple structure to a more complex structure such as an object. The "feature" concept is very general and the choice of features in a particular application may be highly dependent on the specific problem at hand. In the example above in which the data is of dimension N=25, each component in the vector of dimension 25 is a feature.

"Clustering", as applied to data comprised of data points, refers to the process of finding in the data similar areas which identify common (similar) trends. These areas are called clusters. "Clustering" is also defined as the assignment of a set of observations into subsets (the clusters), such that observations in the same cluster are similar in some sense. Data clustering algorithms can be hierarchical. Hierarchical algorithms find successive clusters using previously established clusters. "Successive" refers to an operation which advances in time. Hierarchical algorithms can be either agglomerative ("bottom-up") or divisive ("top-down"). Agglomerative algorithms begin with each element as a separate cluster and merge them into successively larger clusters. Divisive algorithms begin with the whole set and proceed to divide it into successively smaller clusters. Hierarchical clustering methods are described for example in S. C. Johnson, "Hierarchical Clustering Schemes", Psychometrika, vol. 2, pages 241-254, 1967 and in U.S. Pat. Nos. 7,590,291 and 7,627,542, all of which are incorporated herein by reference in their entirety.

A distance measure is an important step in any clustering. The distance measure determines how the similarity of two data points is determined. This influences the shape of the clusters, as some data points may be close to one another according to one distance measure and far from one another according to another distance measure.

Diffusion maps were introduced in R. R. Coifman and S. Lafon, "Diffusion maps", Applied and Computational Harmonic Analysis, vol. 21(1), pages 5-30, 2006 (referred to hereinafter as "DM") and in US patent application 20060004753A1, both incorporated herein by reference in their entirety. A diffusion map constructs coordinates that parameterize the dataset, while a diffusion distance provides a local preserving metric for this data. Let $\Gamma=\{x_1, \ldots x_n\}$ be a set of points in $R^n$. We construct the graph $G(V, E), |V|=m, |E|<<m^2$, on $\Gamma$ in order to find the intrinsic geometry of this set. A weight function $W_\in = w_\in(x_i, x_j)$, which measures the pair-wise similarity between the points in a dataset, is introduced. For all $x_i, x_j \in \Gamma$, this weight function is symmetric, non-negative and positive semi-definite. A common choice for $W_\in$ is $$w_\varepsilon = e^{-\frac{\|x_i - x_j\|^2}{\varepsilon}}$$

and $\in$ is a parameter determined as explained below. The non-negativity property of $W_\in$ allows to normalize the assigned data into a Markov transition matrix $P=\{p(x_i, x_j)\}$, $i,j=1, \ldots, m$, in which the states of the corresponding Markov process are the data points. This enables to analyze $\Gamma$ as a random walk.

The construction of P is known as the normalized graph Laplacian, described in Spectral Graph Theory, Fan R. K. Chung, CBMS Regional Conference Series in Mathematics, No. 92, 1997. Formally, $P=\{p(x_i, x_j)\}_{i,j=1}^m$ is constructed as $$p(x_i, x_j) = \frac{w_\varepsilon}{d(x_i)}, \quad \text{where } d(x_i) = \int_\Gamma w_\varepsilon(x_i, x_j) d\mu(x_j)$$

is the degree of $x_i$ and $\mu$ is the distribution of the points on $\Gamma$. P is a Markov matrix, since the sum of each row in P is 1 and $P(x_i, x_j) \geq 0$. Thus, $p(x_i, x_j)$ can be viewed as the probability to move from one point $x_i$ to another $x_j$ in one time-step. By raising this quantity to a power t (advance in time), this influence is propagated to nodes in the neighborhood of $x_i$ and $x_j$ and the result is the probability for this move in t time-steps. We denote this probability by $p_t(x_i, x_j)$. The probabilities between all the data points (for t=1) or set of folders (for t>1) measure the connectivity among the data points within the graph $G(V, E), |V|=m, |E|<<m^2$. The parameter t controls the scale of the neighborhood in addition to the scale control provided by $\in$.

$$p(x_i, x_j) = \frac{\sqrt{d(x_i)}}{\sqrt{d(x_j)}} p(x_i, x_j),$$

which is a symmetric and positive definite kernel, leads to the following eigen-decomposition: $p(x_i, x_j)=\Sigma_{k>0}{}^m \lambda_k v_k(x_i) v_k(x_j)$. A similar eigen-decomposition is obtained from $p_t(x_i, x_j)=\Sigma_{k\geq 0}{}^m \lambda_k{}^t v_k(x_i) v_k(x_j)$ after advancing t times on the graph. Here $p_t(x_i, x_j)$ is the probability of transition from $x_i$ to $x_j$ in t time-steps.

A fast decay of $\{\lambda_k\}$ is achieved by a choice of $\in$. Thus, only a few terms are required in the sum above to achieve a given relative cover $\delta>0$. Assume $\eta(\delta)$ to be the number of retained terms. The diffusion maps introduced in DM include a family $\Phi_t(x)_{m\in}$ given by $\phi_t(x)=(\lambda_0{}^t v_0(x), \lambda_1{}^t v_1(x), \ldots)^T$. The map $\Phi_m: \Gamma \to l^N$ embeds the dataset into a Euclidean space $R^N$. The diffusion distance is defined as $D_t^2(x_i, x_j)=\Sigma_{k\geq 0}(p_t(x_i, x_k)-p_t(x_k, x_j))^2$. The diffusion distance can be expressed in terms of the right eigenvectors of P: $D_t^2(x_i, x_j)=\Sigma_{k\geq 0}\lambda_k^{2t}(v_k(x_i)-v_k(x_j))^2$. It follows that in order to compute the diffusion distance, we can use the eigenvectors of $\tilde{P}$. Moreover, this facilities the embedding of the original points in a Euclidean space $R^{\eta(\delta)-1}$ by $\Xi_t: x_i \to (\lambda_0{}^t v_0(x_i), \lambda_1{}^t v_1(x_i), \lambda_2{}^t v_2(x_i), \ldots, \lambda_{\eta(\delta)}{}^t v_{\eta(\delta)}(x_i))$. This also provides coordinates on the set $\Gamma$. Essentially, $\eta(\delta) \ll m$, due to the fast spectral decay of the spectrum of P.

P is the affinity matrix of the dataset and it is used to find the diffusion distances between data points. This distance metric can be used to cluster the data points according to the propagation of the diffusion distances that is controlled by t. In addition, it can be used to construct a bottom up hierarchical clustering of the data. For t=1, the affinity matrix reflects local and direct connections between adjacent data points. The resulting clusters preserve the local neighborhood of each point. By raising t, the affinity matrix is changed accordingly and it reflects indirect connections between data points in the graph. The diffusion distance between data points in the graph represents all possible paths between these points according to the step in time. The more we advance in time, the more we increase indirect and global connections. Therefore, by raising t we can construct the top levels of the clustering hierarchy. In each advance in time, it is possible to merge more and more bottom-level clusters since there are more and more new paths between them. The resulting clusters reflect the global neighborhood of each point, which is highly affected by the parameter t.

In known hierarchical clustering methods, the affinity matrix and the diffusion distances are global. With the advance in time, more global "rare connections" (sparse, loose data points) become part of the generated clusters. This translates into increased noise in the affinity matrix. The resulting clusters become sensitive to the parameters t and $\in$ and to the geometry of the dataset. In other words, by increasing t in this global approach, the clustering noise in the affinity matrix is increased. This causes convergence of data points to only a few clusters which may be "wrong" clusters, leading to a decrease in the clustering accuracy.

Accordingly, there is a need for and it would be advantageous to have a hierarchical clustering method that uses a local instead of a global approach in order to increase the accuracy of the clustering.

SUMMARY OF THE INVENTION

The invention presents a method for hierarchical clustering of high-dimensional data using local diffusion folders (LDF), also referred to herein simply as "folders". In addition to the concept of a "local" diffusion folder, we also introduce the concept of a "super-LDF", which is a "LDF of LDFs". The inputs to a LDF are data points, while the inputs to a super-LDF are LDFs. Sets of LDFs are obtained by repeated random selections of data points around which respective LDFs are organized. Sets of super-LDFs are obtained by repeated random selections of LDFs around which super-LDFs are organized. Diffusion folders become "local" by repeated partitioning (at least twice) of data points (or of LDFs in the case of super-LDFs). The partitioning is multi-level.

The exposure of a new local geometry is provided by local connections from affinities generated by diffusion distances between the data points (in t=1) and between the folders (in t>1), which lead to an "initial" local affinity matrix ("initial LAM") in t=1 and to a "folder LAM" in t>1. With the advance in time, the affinity-based geometry improves, the noise in each new folder LAM decreases and the accuracy of the resulting clusters improves.

The affinity between any two LDFs is defined by the local diffusion distance metric between the points in the two LDFs. In order to define this distance metric, we construct a local sub-matrix which includes only the affinities between data points (if t=1) or between folders (if t>1). This sub-matrix is raised by the power of the current time-step (according to the current level in the hierarchy) and is then used to find the local diffusion distance between the two folders. The result is a bottom-up hierarchical data clustering, where each level in the hierarchy includes LDFs or super LDFs from the bottom levels. Each level in the hierarchy defines a new local affinity (geometry) constructed dynamically and used in the top level in the respective time-step. In the following description, "bottom level" and "top level" refer to the two levels involved in each "two-level processing" stage in the clustering process, see below. This methodology preserves the local neighborhood of each point, while eliminating the noisy connections between distinct points and areas in the graph.

According to the invention there is provided a method of clustering of multi-dimensional data which includes a plurality of data points, the method comprising the steps of: at a lowest level of the hierarchy, partitioning the data points into at least two sets of non-overlapping local diffusion folders (LDFs) and at a higher level of the hierarchy, processing all LDFs in the sets into at least one super-LDF, wherein each super-LDF represents a cluster.

In an embodiment of the method, the step of partitioning includes constructing an initial local affinity matrix (LAM) which is further used to construct a respective set of non-overlapping LDFs.

In an embodiment of the method, the constructing an initial LAM includes processing the plurality of data points into a Markov transition matrix.

In an embodiment of the method, the constructing a Markov transition affinity matrix includes building a matrix C of size m×n of data points, where m is the number of data points and n is the number of features in each data point; normalizing matrix C to obtain a normalized matrix A; processing normalized matrix A to construct a similarity matrix $\tilde{A}$; processing similarity matrix $\tilde{A}$ to construct a Gaussian kernel K; and normalizing the Gaussian kernel K into the Markov transition matrix.

In an embodiment of the method, the step of processing all LDFs includes: using all LDFs obtained in a previous step to construct a folder LAM, and using the folder LAM to construct the at least one super-LDF.

In an embodiment, the method further comprises the step of: checking whether the at least one super-LDF is a single super-LDF and if not, processing all super-LDFs into a single root super-LDF.

In an embodiment of the method, the constructing a respective set of non-overlapping LDFs includes (i) randomly selecting an initial data point, (ii) building a diffusion folder around the initial data point, and repeating (i) and (ii) with different randomly selected initial data points to construct a Voronoi diagram of LDFs.

In an embodiment of the method, the using of all LDFs to construct a folder LAM includes repeating r times the construction of the Voronoi diagram of LDFs to obtain r super-LDFs and processing the r super-LDFs to obtain the folder LAM.

In embodiments of the method, a data point may be a record of a data network activity, a vector of wine constituents, a vector of plant variables, or an image pixel.

According to the invention there is provided a digital computer system comprising a storage area for storing multi-dimensional data which includes a plurality of data points, the data input by an input/output component; and a program of instructions, executable by a central processing unit to perform on the data a method of clustering, the method comprising the steps of: at a lowest level of the hierarchy, partitioning the data points into at least two sets of non-overlapping local diffusion folders (LDFs); and at a higher level of the hierarchy, processing all LDFs in the sets into at least one super-LDF, wherein each super-LDF represents a cluster.

In embodiments of the system, a data point may be a record of a data network activity, a vector of wine constituents, a vector of plant variables, or an image pixel.

BRIEF DESCRIPTION OF THE DRAWINGS

The invention is herein described, by way of example only, with reference to the accompanying drawings, wherein:

FIG. 11b is a flow chart illustrating substeps in the flow chart of FIG. 11a;

DETAILED DESCRIPTION OF THE INVENTION

Figure 1:
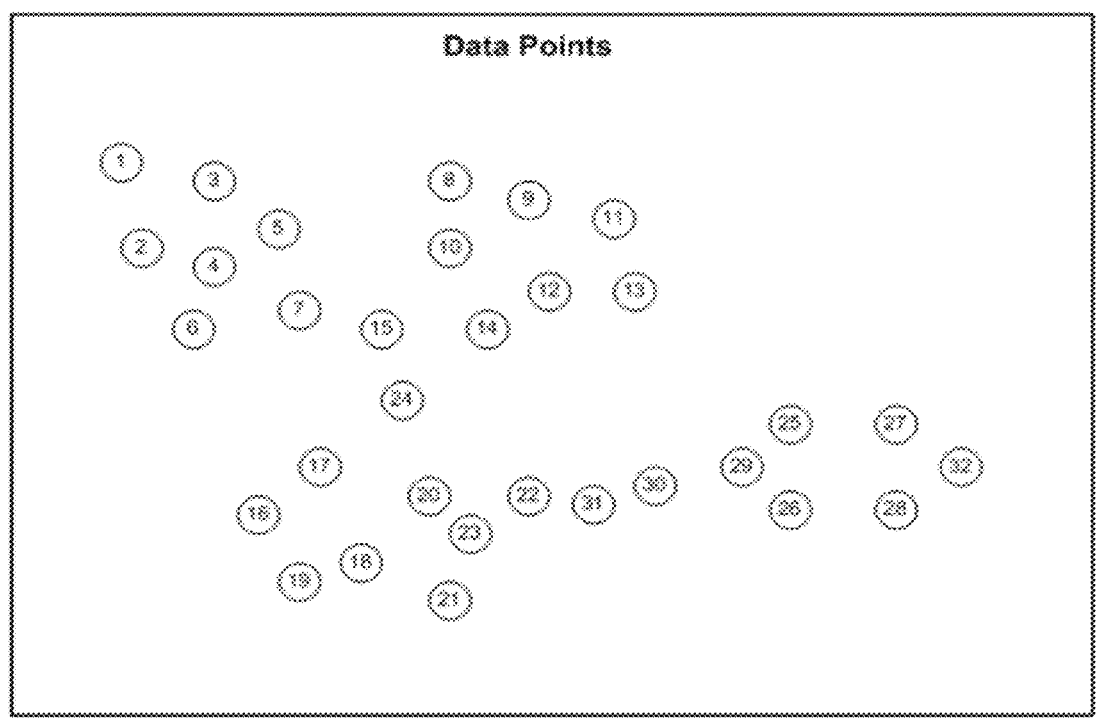
FIG. 1 shows an exemplary set of data points.

In general, the construction of the LDF hierarchy is based on two consecutive hierarchy levels at a time (also referred to as "two-level processing"). The two-level processing is repeated up to the root of the hierarchy. In some embodiments, the process may end before reaching the root of the hierarchy. In other embodiments, the process ends at the root, with the construction of a single "root super-LDF". For example, assume that the root is reached in level 5. We first process (at t=1) level 1 (data points) and level 2, where level 1 is a "bottom level" and level 2 is a "top level". Then, at t=2, we advance to process level 2 (LDFs) and level 3, where level 2 is the bottom level and level 3 is the top level. The two-level processing is repeated with levels 3 and 4 (t=3) and with levels 4 and 5 (t=4). In more detail, for each two-level processing stage:

1. The bottom level is constructed as follows: first, the input can be either data points partitioned into LDFs (true in the lowest hierarchy level, t=1), or a set of LDFs (in the rest of the levels, t>1).
2. The top level is constructed as follows: an initial LAM (for t=1) or a folder LAM (for t>1), which defines the geometry between all the LDFs, is constructed. Then, multiple sets of LDFs (t=1) or sets of super-LDFs (t>1) are constructed. Next constructed is a new folder LAM, which defines the geometry between the LDFs in the multiple sets of LDFs or super-LDFs. The construction of folder LAMs and sets of super-LDFs then continues up the hierarchy.

Figure 2:
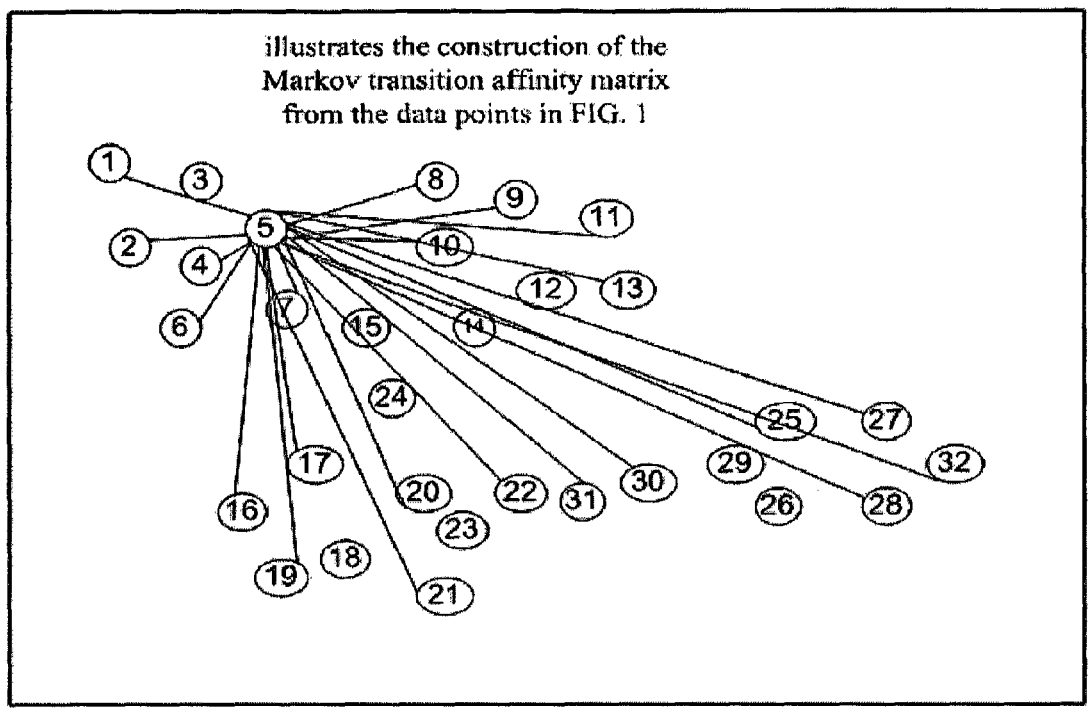
FIG. 2 illustrates the construction of the Markov transition affinity matrix from the data points in FIG. 1.

The various steps are illustrated by a running example. Assume that the input to the LDF algorithm is a set of data points shown in FIG. 1. There are 32 data points, numbered 1 to 32. The first step constructs the Markov transition affinity matrix, which defines the pair-wise diffusion distances between each point and any other point in the graph, see FIG. 2. Exemplarily, FIG. 2 shows data point 5 connected to all the other 31 data points. The partitioning of the points into non-overlapping LDFs takes place by random selection of initial data points in FIG. 1 and use of the affinity matrix.

Figure 3:
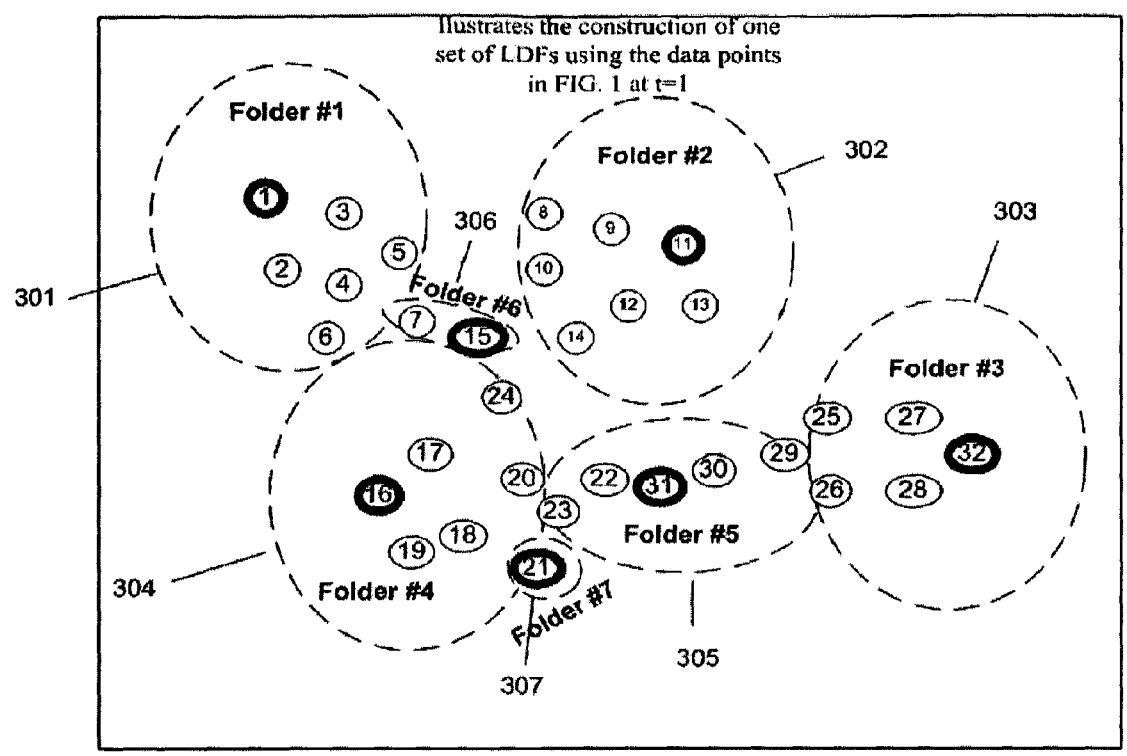
FIG. 3 illustrates the construction of one set of LDFs using the data points in FIG. 1 at t=1.
Figure 4:
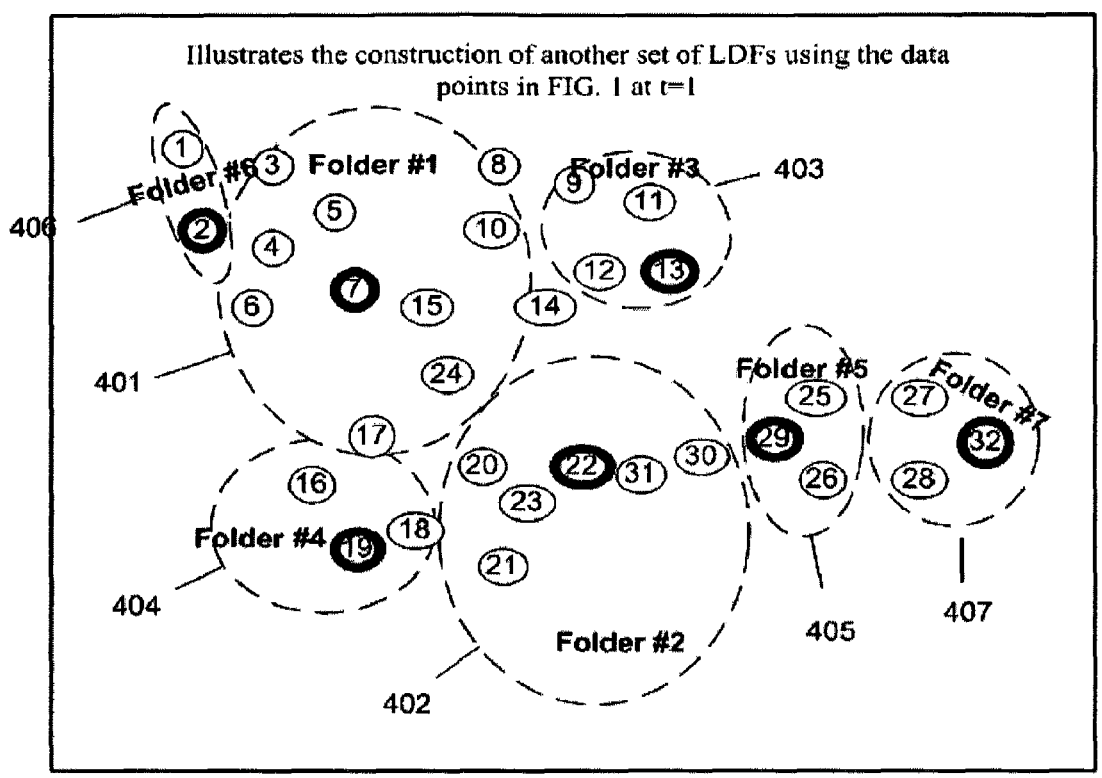
FIG. 4 illustrates the construction of another set of LDFs using the data points in FIG. 1 at t=1.

FIG. 3 illustrates a first set of non-overlapping LDFs 301, 302, 303, 304, 305, 306 and 307 formed at t=1. Points 1, 11, 32, 16, 31, 15 and 21 are, respectively, randomly selected initial data points in these LDFs. The partitioning process is repeated (still at t=1) by randomly selecting other initial data points and building folders around them. FIG. 4 shows a second set of non-overlapping LDFs 401, 402, 403, 404, 405, 406 and 407, formed respectively around randomly selected initial points 7, 22, 13, 19, 29, 2 and 32. The process may be repeated, each time yielding a different set of LDFs.

Figure 5:
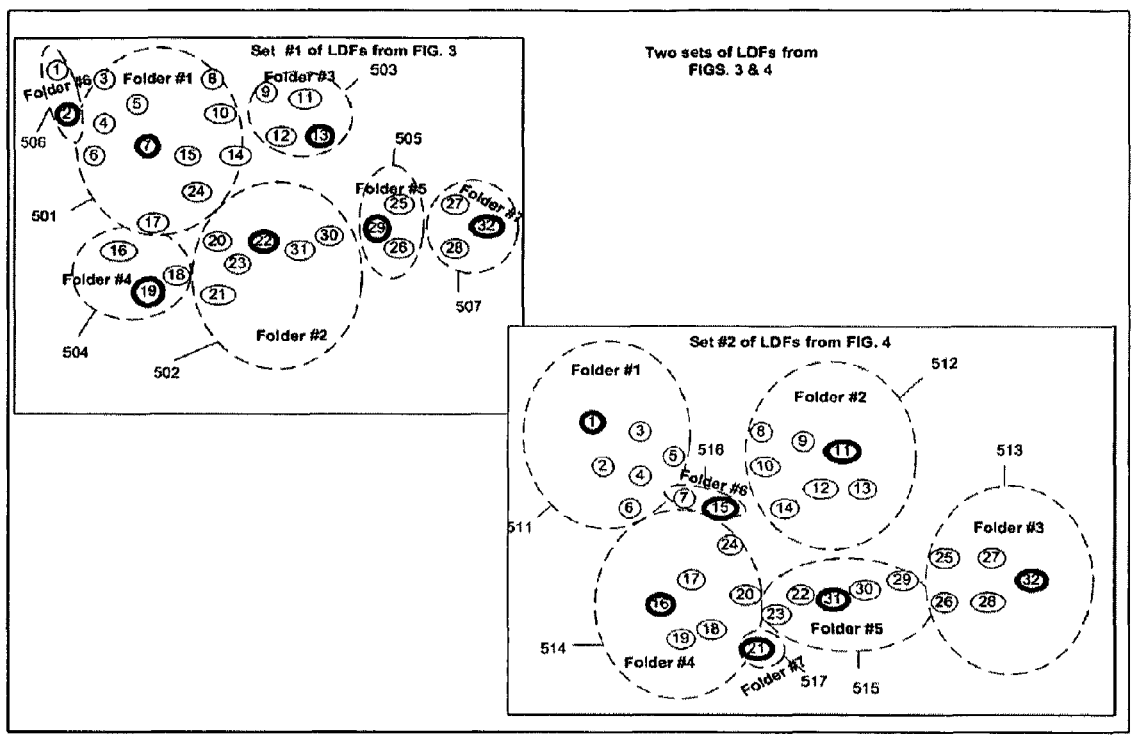
FIG. 5 shows the two sets of LDFs from FIGS. 3 and 4.

Next, super-LDFs are constructed from LDFs. FIG. 5 illustrates such a construction using the LDFs from FIGS. 3 and 4. One can see that each data point can reside in a different folder in each LDF set. For example, data point 25 resides in folder 5 in 505 in the LDF set #1, while data point 25 resides in folder 3 in 513 in LDF set #2. In other words, for every LDF set, each point can be associated with a different neighborhood. Next, a folder LAM is constructed by fusing all LDF sets. For each point, its distance to all other points is defined as the relative probability of residing in the same neighborhood. Thus, the different LDF sets are used to define a new affinity between the data points.

Figure 6:
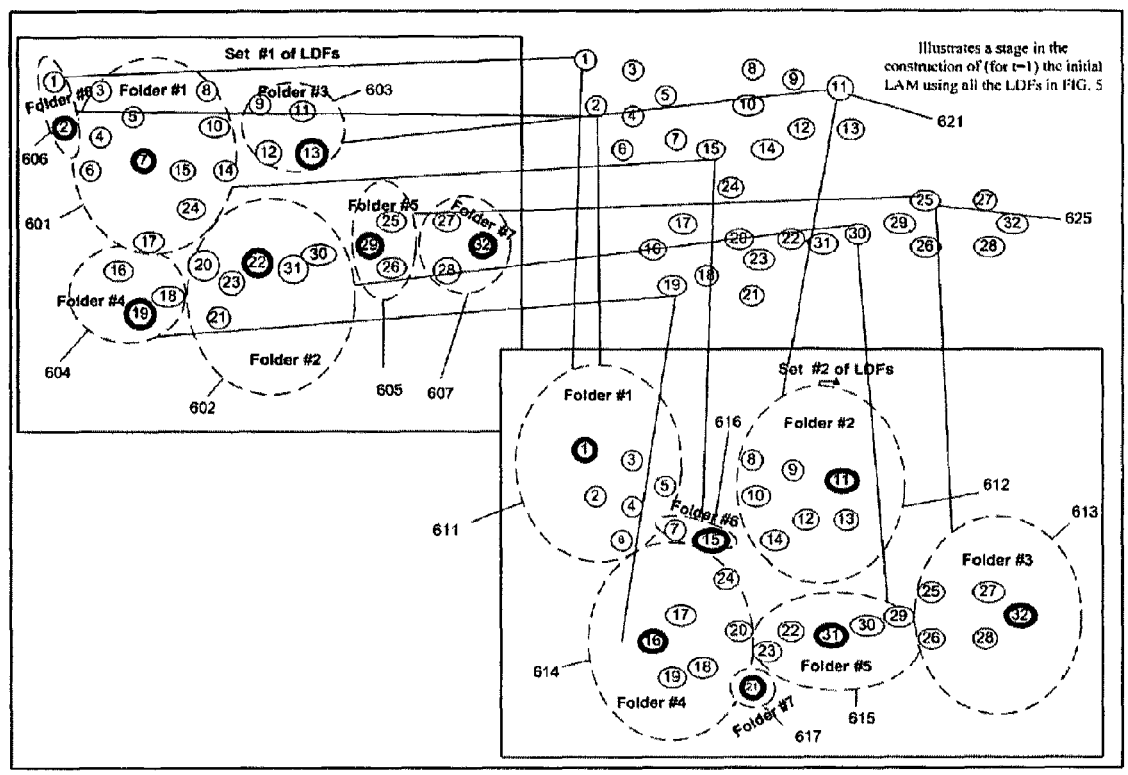
FIG. 6 illustrates a stage in the construction of (for t=1) the initial LAM using all the LDFs in FIG. 5.

FIG. 6 illustrates the construction of a folder LAM by fusing the two LDF sets of FIG. 5 (#1, folders 601, 602, 603, 604, 605, 606 and 607 and #2, folders 611, 612, 613, 614, 615, 616 and 617). Data point 11, denoted by 621, which connects folder 603 in set #1 and folder 612 in set #2, and data point 25 denoted by 625, which connects folder 605 in set #1 and folder 613 in set #2, are part of the folder LAM construction. A "super-LDF" is now constructed using this folder LAM and in shown in FIG. 7 to include folders 701, 702, 703, 704, 705, 706 and 707.

In order to improve the clustering, we build the next level (time t>1). In order to construct t>1 level super-LDFs, we define an affinity between LDFs (while at level t=1 the affinity was between data points). At this level, the affinity between LDFs is defined by defining pair-wise diffusion distances between the bottom level LDFs. This diffusion distance is computed locally by raising the local sub-matrix of the folders by the power of the current level (t).

Figure 7:
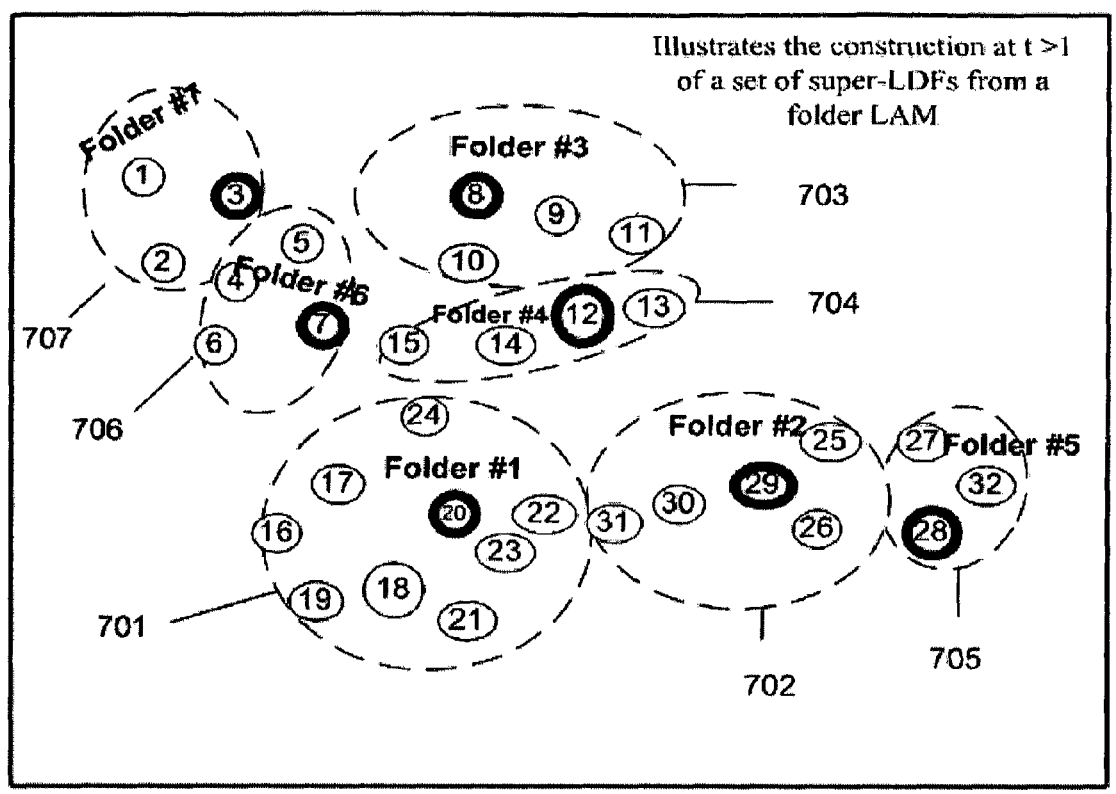
FIG. 7 illustrates the construction at t>1 of a set of super-LDFs from a folder LAM.
Figure 8:
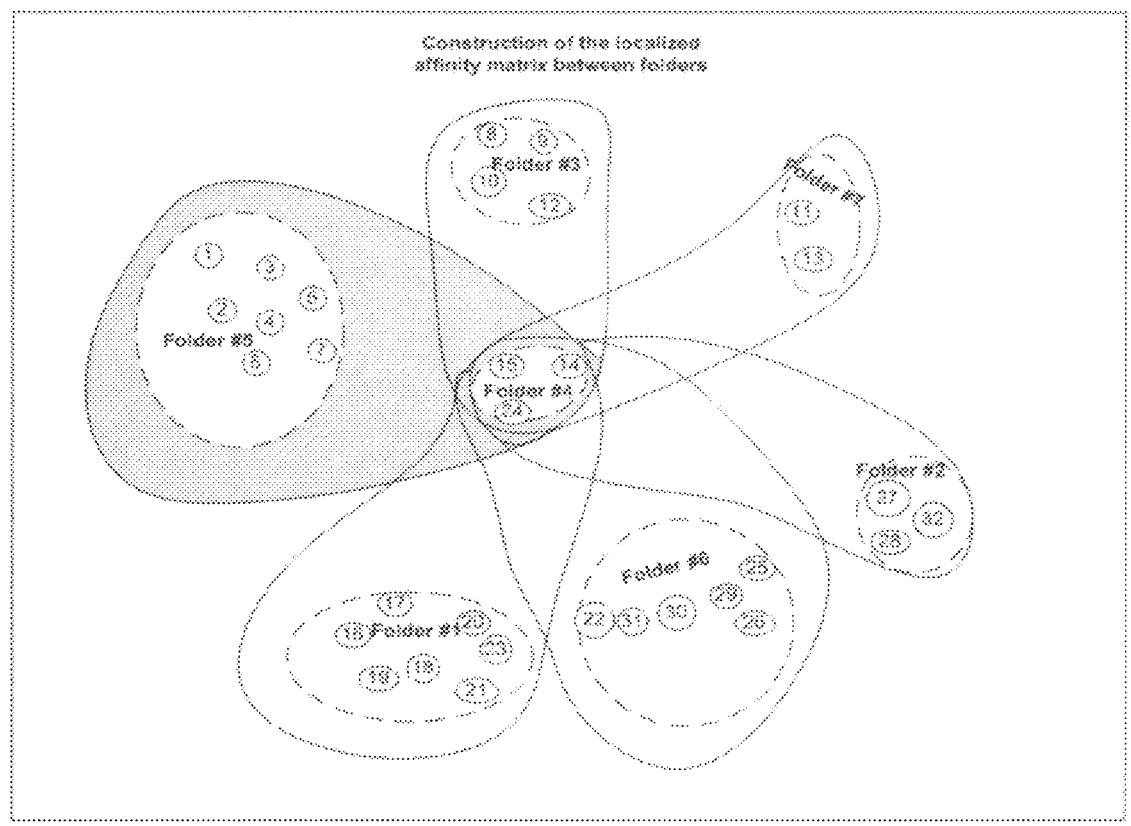
FIG. 8 illustrates the construction of a higher level folder LAM using all the sets of super-LDFs in FIG. 7.
Figure 9:
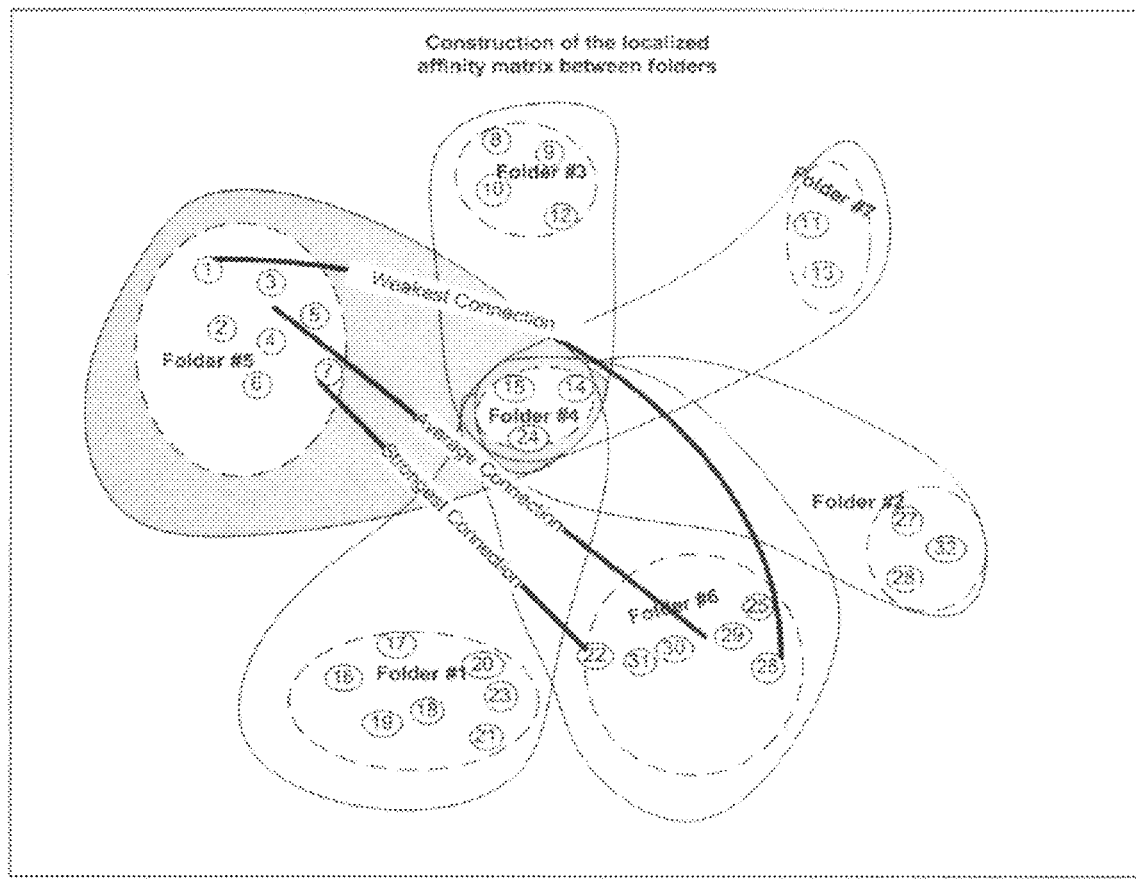
FIG. 9 illustrates the different metrics used in the construction of the folder LAM.
Figure 10:
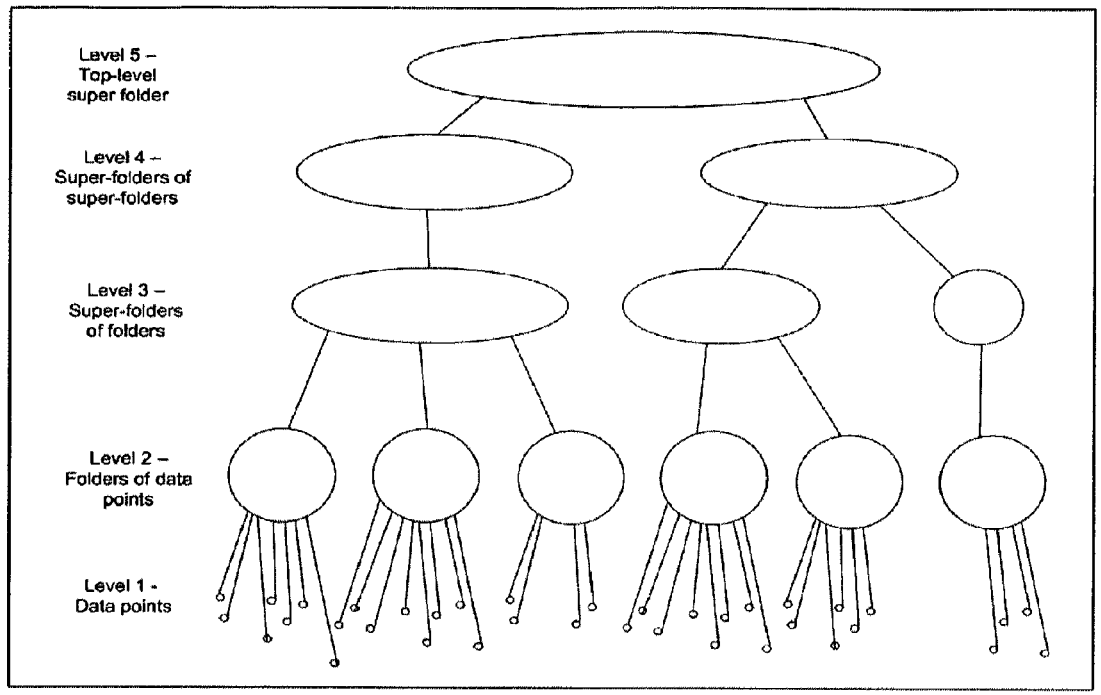
FIG. 10 illustrates the entire bottom-up hierarchy.

FIG. 8 illustrates the construction of a higher level folder LAM using all the sets of super-LDFs in FIG. 7. FIG. 9 shows the different distance metrics used for the construction of the folder LAM in FIG. 8. Once the local affinity between LDFs is defined, we continue with the construction process using the two-level processing. This way, we advance in time and more levels are added to the hierarchy. FIG. 10 shows the final bottom-up hierarchy of the entire set of LDFs, which ends in the construction of the single root super-LDF.

DETAILED AND FORMAL DESCRIPTION OF THE LDF METHODOLOGY

The following is given as an enabling and exemplary detailed description of the bottom-up hierarchical clustering method of the invention. Although described in detail with reference to particular mathematical and algorithmic procedures, it should be understood that, except for the use of the described local diffusion procedures, steps 1302-1306 below, other mathematical and algorithmic procedures may be used and may replace one or more of the particular procedures described herein, without in any way affecting the scope of the protection sought, which is solely defined by the claims.

Figure 11A:
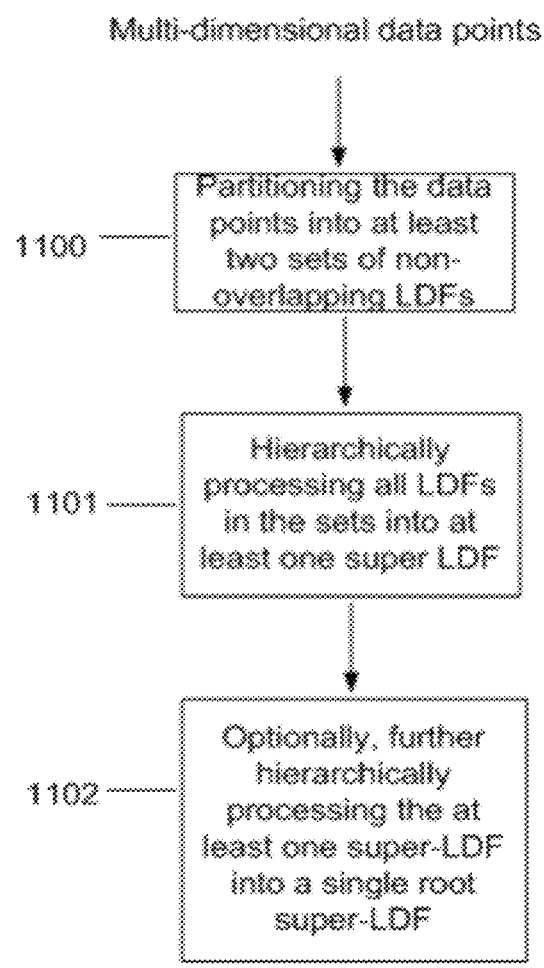
FIG. 11a is a flow chart illustrating the main steps of a method of the invention.

FIG. 11a is a flow chart illustrating the main steps of a method of the invention. In step 1100, the data points are partitioned into at least two sets of non-overlapping LDFs. In step 1101, all LDF sets from step 1100 are hierarchically processed into at least one super-LDF. If the at least one super-LDF includes a plurality of LDFs, the process may optionally continue with step 1102, until a single root super-LDF is constructed.

Figure 11B:
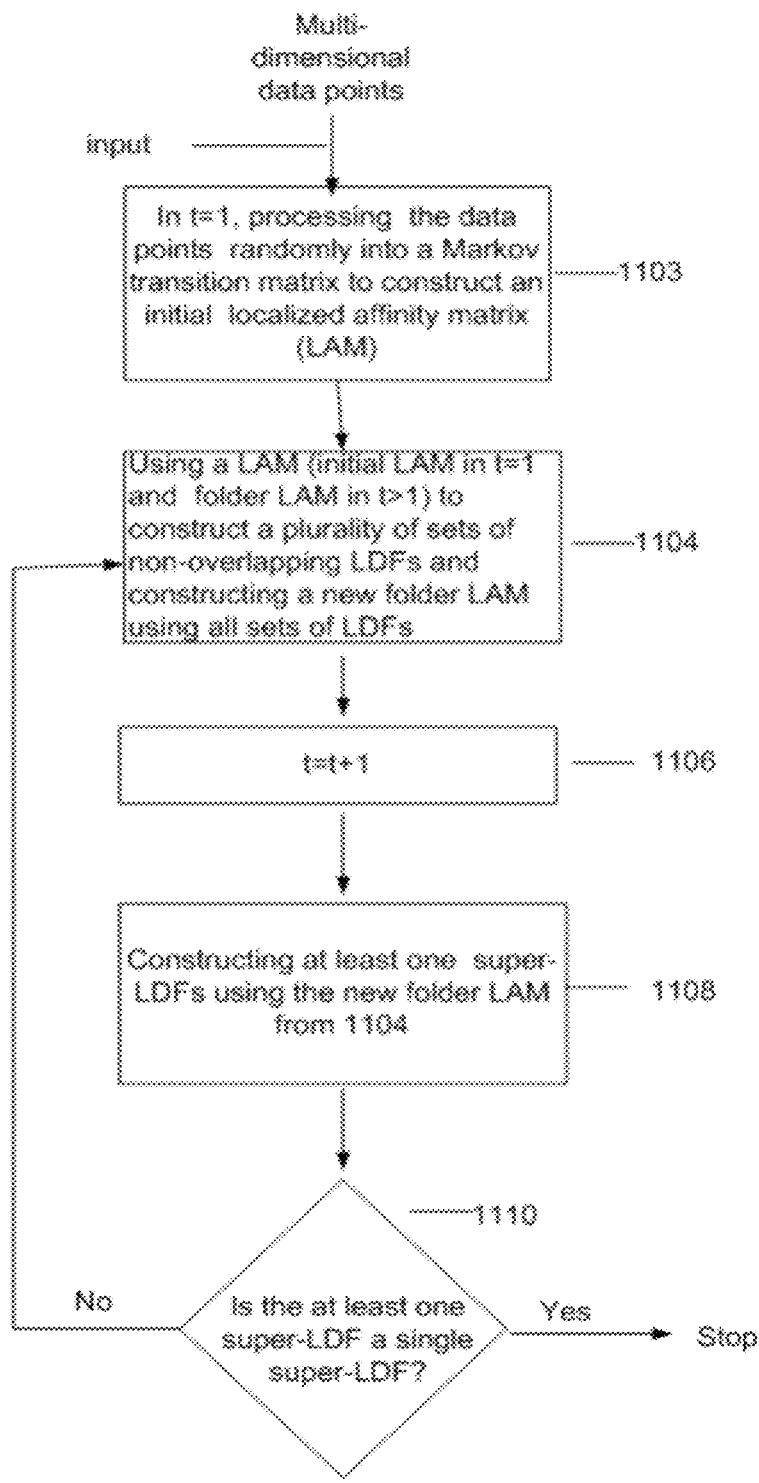

FIG. 11b is a flow chart providing details of the steps in FIG. 11a. In step 1103, for t=1, the data points are processed randomly into a Markov transition matrix to construct the initial LAM. This initial LAM is used to construct non-overlapping sets of LDFs, as shown exemplarily in FIGS. 3 and 4. In step 1104, still for t=1, a folder LAM is constructed using all the LDFs in the sets. In step 1106, level t is increased by 1. In step 1108, at least one super-set of LDFs using the folder LAM from time t−1 (step 1104) is constructed. In step 1110, a check is made to determine if the at least one super-set is a single set. If Yes, the process ends. If No, the process optionally returns to step 1104 and is repeated up to the root of the hierarchy. ending in the construction of a single super-LDF.

Figure 12:
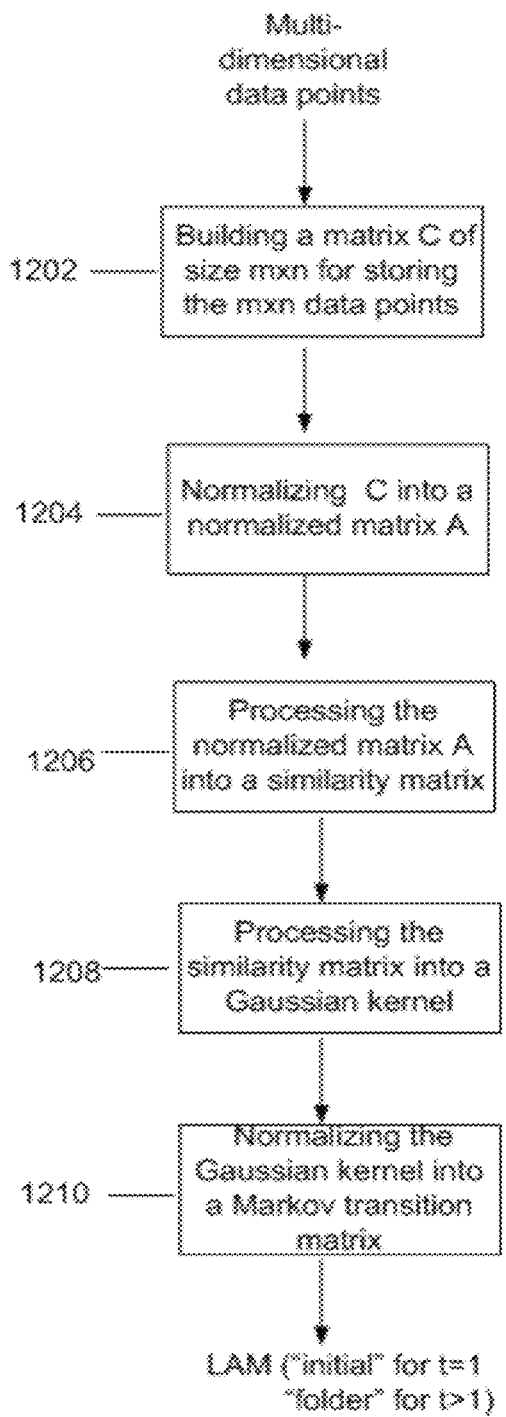
FIG. 12 is a flow chart illustrating sub-steps of step 1103 in FIG. 11b.
Figure 13:
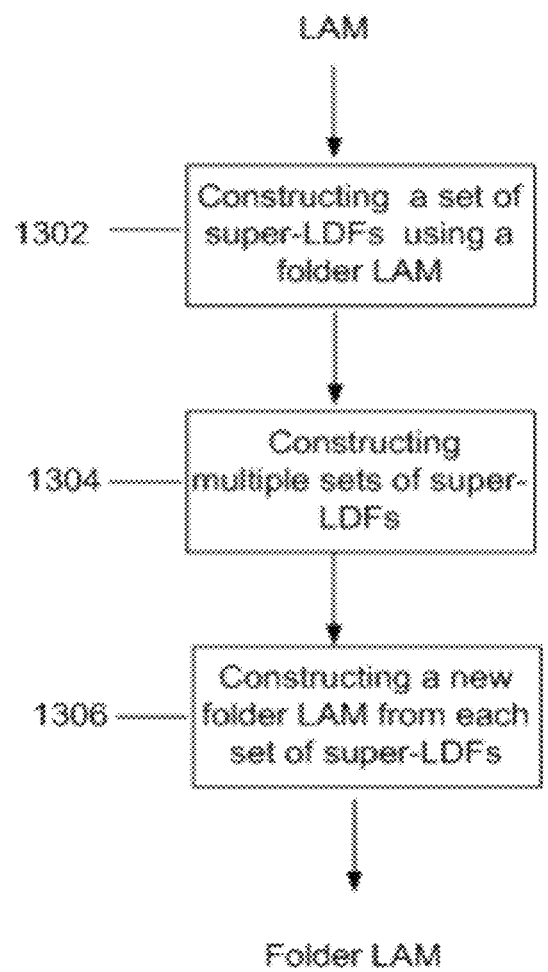
FIG. 13 is a flow chart illustrating sub-steps of step 1104 in FIG. 11b.

The LDF algorithm is next described in detail. The description is divided into three stages: 1) construction of a bottom level at t=1; 2) construction of a bottom level at t>1; and 3) construction of a top level at all hierarchy levels (all "t"s). The details are described with reference to FIGS. 12 and 13. FIG. 12 relates to sub-steps of step 1103 in FIG. 11 and FIG. 13 relates to sub-steps of step 1104 in FIG. 11.

1. Construction of the bottom level of the hierarchy at t=1:
   a. Step 1202 (FIG. 12): Let C be a matrix of size m×n of data points, where m is the number of data points (number of measurements) and n is the number of features in every data point which is the dimension of each data point. Each data point is a row vector in C where the size of the row is the dimension of the data points.
   b. Step 1204—Normalization of the matrix C: This normalization is necessary in order to transform all the features to a common scale. A common way to perform it is by taking the logarithmic value of each feature. Assume $r, 1 \leq r \leq m$, is a row in C denoted by $c_r = \{c_{ri}: 1 \leq i \leq n\}$. The normalized vector $a_r$ is constructed by $a_r = \log(c_r)$, $r = 1, \ldots, m$. The normalizing of each row in input matrix C results in a normalized matrix A.
   c. Step 1206—Processing of normalized matrix A—construction of the similarity matrix $\tilde{A}$: Denote the row vector in normalized matrix A by $a_i = \{a_{ik}: 1 \leq k \leq n\}$. The pair-wise distances between the data points in A are computed by using a weight distance metric to produce $\tilde{A}$ whose entries are $\tilde{a}_{ij}$. Common distance metrics are:
      i. Euclidean distance metric:

$$\tilde{a}_{ij} = \left\{ \sqrt{(a_i - a_j) \cdot (a_i - a_j)^T} : i, j = 1, \ldots, m \right\}.$$

ii. Weighted Euclidean distance metric:

$$\tilde{a}_{ij} = \left\{ \sqrt{\frac{(a_i - a_j)}{w} \cdot \left(\frac{(a_i - a_j)}{w}\right)^T} : i, j = 1, \ldots, m \right\}$$

where $w = \{w_k: k=1, \ldots, n\}$ is a weighting factor vector. As $w_k$ becomes larger, the influence of the $k^{th}$ feature on the distance between $a_i$ and $a_j$ becomes smaller.

iii. Cosine distance metric:

$$\tilde{a}_{ij} = \left\{ \left(1 - \frac{a_i a_j^T}{\sqrt{a_i^T \cdot a_i}\sqrt{a_j^T \cdot a_j}}\right) i, j = 1, \ldots, m \right\}.$$

iv. Mahalanobis distance metric: $\tilde{a}_{ij} = \{\sqrt{(a_i - a_j) \cdot \Sigma^{-1} \cdot (a_i - a_j)^T} : i, j = 1, \ldots m\}$ where $\Sigma$ is the sample covariance matrix. $\Sigma$ can also be the features matrix.

d. Step 1208—Processing of similarity matrix $\tilde{A}$—construction of the Gaussian kernel K:

i. Construction of the Gaussian kernel: We construct the Gaussian kernel $$K_{ij} = e^{-\frac{\tilde{a}_{ij}}{\varepsilon}}, i, j = 1, \ldots, m.$$

For each point $a_i \in A$, this Gaussian kernel pushes away from $a_i$ all the points that are already far away from $a_i$ (according to $\tilde{A}$). On the other hand, it pulls towards $a_i$ all the points that are already close to $a_i$. This process is controlled by $\in$. Since $\in$ is fixed for all the entries in A, it produces a coarse scaling control. This scale control is obviously not optimal for all the entries in the Gaussian kernel, since it does not take into account the local geometry of each data point in the graph. Therefore, a selection of an adaptive scale control is necessary in order to construct a more accurate Gaussian kernel which will express the local geometry of each data point in the graph.

ii. Construction of an adaptive Gaussian kernel: this is done to determine automatically an adaptive scale control for each point in the graph. This adaptive scale control is a weight function which has the following property: data points in dense areas will have a large weight ("bonus") and data points in sparse areas will have a small weight ("penalty"). Since dense-areas points are close to many points and sparse-area points are far away from many points, we define the weight function ω to $$\text{be } \omega_i^\varepsilon = \int_A e^{-\frac{\tilde{a}_{ij}}{\varepsilon}} d\mu(a_j)$$

where $A = \{a_1, \ldots, a_m\}^T$, μ is the distribution of the points on A and $\in$ is an initial scale control. $\omega_i^\in, i=1, \ldots m$ defines an adaptive weight for each data point. However, since we construct an affinity matrix between pairs of data points, we need to define a pair-wise weight function. This way, we determine not only an adaptive scale for each point in A, but also an adaptive scale for each pair of points. We define the pair-wise weight function $\Omega^\in$ to be $$\Omega_{ij}^\varepsilon = \sqrt{\int_A e^{-\frac{\tilde{a}_{ik}}{\varepsilon}} d\mu(a_k) \int_A e^{-\frac{\tilde{a}_{jk}}{\varepsilon}} d\mu} = \sqrt{\omega_i^\varepsilon \omega_j^\varepsilon}.$$

$\Omega^\in$ satisfies the "bonus" and the "penalty" property. Moreover, $\Omega^\in$ is symmetric and non-negative. Now, we construct the adaptive Gaussian kernel K as follows:

$$K_{ij} = e^{-\frac{\tilde{a}_{ij}}{\sqrt{\omega_i^\varepsilon \omega_j^\varepsilon}}} = e^{-\frac{\tilde{a}_{ij}}{\Omega^\varepsilon}}, i, j = 1, \ldots, m.$$

Since both $\tilde{A}$ and $\Omega^\in$ are symmetric and non-negative, the constructed kernel K is symmetric and non-negative as well. This adaptive scale control provides better and compact description of the local geometric properties of the pair-wise distances matrix $\tilde{A}$. This process can be repeated several times and $K_{ij}$ represents optimally the nature of the local geometry of A.

e. Step 1210—Normalizing the Gaussian kernel K into a Markov transition matrix: The non-negativity property of K allows to normalize it into a Markov transition matrix $P^t$ where the states of the corresponding Markov process are the data points. This enables to analyze C as a random walk. $K_{ij}$ is normalized into a matrix $P_{ij}^t$ by one of the following methods:

i. Graph Laplacian matrix:

$$P_{ij}^t = \frac{K_{ij}}{\sqrt{\sum_{q=1}^m K_{iq}} \sqrt{\sum_{q=1}^m K_{jq}}}.$$

ii. Laplace-Beltrami matrix: First, we compute the graph Laplacian matrix $$\tilde{P}_{ij}^t = \frac{K_{ij}}{\sqrt{\sum_{q=1}^m K_{iq}} \sqrt{\sum_{q=1}^m K_{jq}}}.$$

We repeat this process and get the Laplace-Beltrami matrix $$P_{ij}^t = \frac{\tilde{P}_{ij}^t}{\sqrt{\sum_{q=1}^m \tilde{P}_{iq}^t} \sqrt{\sum_{q=1}^m \tilde{P}_{jq}^t}}.$$

$P^t$ is a Markov matrix since the sum of each row in $P^t$ is 1 and $P_{ij}^t \geq 0$. Thus, $P_{ij}^t$ can be viewed as the probability to move from $a_i$ to $a_j$ in t time steps. By raising this quantity by a power t, this influence is propagated to nodes in the neighborhood of $a_i$ and $a_j$ and the result is the probability for this move in t time steps. We denote this probability by $p_{ij}^t$. These probabilities measure the connectivity among the points within the graph. The parameter t controls the scale of the neighborhood in addition to the scale control provided by $\in$. $P^1$ is used as the initial affinity matrix of the graph.

2. Construction of the bottom level of the hierarchy at $t \geq 1$:

a. Step 1302 (FIG. 13)—Construction of super-LDFs $D^t$ using the affinity matrix $P^t$: First, an initial partitioning of the points into non-overlapping LDFs is performed. Let $a_i$ be a random point in the dataset. We denote by $N_\in(a_i) = \{a_j : P_{ij}^t > \in, 1 \leq j \leq m, i \neq j\}$ is the neighborhood of $a_i$. This neighborhood includes all the neighbors of the random selected point that their affinity to $a_i$, according to the affinity matrix $P^t$, is greater than $\in$. Now, the LDF is denoted by $D_i^t = \{a_j : a_j \in N_\in(a_i), a_j \notin D_k^t, 1 \leq k \leq q, k \neq i,$ q<<m}. Since the neighborhood $N_\in(a_i)$ can include points which were already associated to neighborhoods of other points, we add to the LDF of $a_i$ only the points that have not already been associated with any other LDF. This way, we partition the points into non-overlapping LDFs. Next, we choose another unassociated random point $a_l$ in the dataset where $a_l \notin D_k^t, 1 \leq k \leq q, q<<m$ and we repeat the above process in order to construct its LDF $D_l^t$. This whole process is repeated until all the points belong to each of the constructed LDFs.

Once all points are assigned and we have a set $D_k^t$, $1 \leq k \leq q, q$ m of LDFs, we have to verify that each point is associated to its nearest neighborhood in order to get accurate LDFs. This is achieved by re-assignment of the points to their nearest neighborhood and then by reconstructing the LDFs accordingly. For each point $a_i, i=1, \ldots, m$, we calculate its average affinity $\mu(a_i, D_k^t)$ to each of the LDFs $D_k^t$, $1 \leq k \leq q, q<<m$ according to the affinity matrix $$P^t: \mu(a_i, D_k^t) = \frac{1}{|D_k^t|} \sum_{l=1}^{|D_k^t|} P_{iD_{kl}^t},$$

where $P_{iD_{kl}^t}$ is the affinity between $a_i$ to the $l^{th}$ point in $D_k^t$. Finally, $a_i$ is reassigned to the LDF with the maximum average affinity $\mu$. Once this process is performed for all points, each point is reassigned to one of the LDFs $D_k^t, 1 \leq k \leq q, q<<m$. Hence, at the end of this process, the members in each LDF can be changed (according to the reassignments). Therefore, the whole process of the reassignment of the points and the reconstruction of the folders is repeated several times, until the convergence of the LDFs is achieved and all folders become stable (i.e. there are no more movements of points between folders). The result of this process is a Voronoi diagram $D^t$ of LDFs which is affected by the initial random selection of the points.

b. Step 1304—Construction of sets of super-LDFs $\tilde{D}^t$: The construction of the Voronoi diagram $D^t$ of super-LDFs is repeated r times to obtain r different sets of super-LDFs. We denote the set of super-LDFs by $\tilde{D}^t = \{D^{(t,k)}: k=1, \ldots, r\}$, where $D^{(t,k)}$ is the $k^{th}$ set of LDFs.

c. Step 1306—Construction of the folder LAM $\hat{P}^t$: We fuse the multiple Voronoi sets of the LDFs $\tilde{D}^t$ in order to get rid of the noise in the original affinity. Then, we reconstruct a cleaner and more accurate affinity matrix $\hat{P}^t$. The key ides of this process is that two points are close to each other if they are associated to the same folder in different sets (at least in the majority of the sets). We define the following metric space $(A, d)$ where $A=\{a_l, \ldots, a_m\}$ is a set of points and d is a metric on A such that $d: A \times A \to R$ is $$d(a_i, a_j) = \begin{cases} 0 & a_i = a_j \\ \frac{1}{2} & a_i \neq a_j \text{ and } a_j \in D_q^t(a_i) \\ 1 & a_i \neq a_j \text{ and } a_j \notin D_q^t(a_i) \end{cases}$$

where $D_q^t(a_i)$ is the folder q in the Voronoi set $D^t$ that includes $a_i$. In order to fuse the multiple Voronoi sets of the LDFs $\tilde{D}^t$, we define the following metric space $(A, d_\mu)$ where $A=\{a_l, \ldots, a_m\}$ is the set of points and $d_\mu$ is a metric on A such that $d_\mu: A \times A \to R$ is $$d_\mu(a_i, a_j) = \frac{1}{|\tilde{D}^t|} \sum_{k=1}^{|\tilde{D}^t|} d_k(a_i, a_j),$$

where $|\tilde{D}^t|$ is the number of Voronoi sets in $\tilde{D}^t$ and $d_k(a_i, a_j)$ is the distance between $a_i$ and $a_j$ according to the metric d and the Voronoi set $D^{(t,k)}$. We define the folder LAM $P^t$ as $P_{ij}^t = 1 - d_\mu(a_i, a_j)$.

The affinity $P^t$ is local and it reduces noise by eliminating rare relations between points. This affinity defines a new geometry on the data according to the actual different partitions of the data. Instead of defining a general affinity on the data, we let the data define the local affinity by itself. We normalize this affinity into a Markov transition matrix (normalized graph Laplacian or Laplace-Beltrami normalization) as described above in e.

d. Construction of the multiple sets of super-LDFs $\hat{S}^t$ using the affinity matrix $P^t$: Once we have the folder LAM $P^t$, created from the multiple sets of LDFs $\tilde{D}^t$, we can construct multiple sets of super-LDFs $\hat{S}^t$. The construction of $\hat{S}^t$ is similar to the construction of the LDF $D^t$ described above in (f), but instead of using the original affinity matrix $P^t$ we use the improved affinity matrix $P^t$. This last step finalizes the construction of the bottom level at the respective t. The final folder LAM $P^t$ is also an input to the next top level construction.

3. Construction of the top level in the hierarchy at each respective $t>1$ a. Input: Let $\hat{S}^{t-1}$ be the super-LDF and let $\hat{P}^{t-1}$ be the folder LAM that were constructed in the bottom level of the respective hierarchy (time t−1).

b. Construction of the local affinity matrix $P^t$ between the bottom-level folders in $\hat{S}^{t-1}$: Let $|\hat{S}^{t-1}|$ be the number of super-LDFs in $\hat{S}^{t-1}$. In order to construct a folder LAM $P^t$ between the bottom-level folders in $\hat{S}^{t-1}$, the pair-wise diffusion distances between each pair of super-LDfs in $\hat{S}^{t-1}$ are computed. Let $\hat{S}_k^{t-1}$ and $\hat{S}_l^{t-1}$ be two different super-LDFs in $\hat{S}^{t-1}, 1 \leq k, l \leq |\hat{S}^{t-1}|$. Then, the sub-matrix of $\hat{P}^{t-1}$, which includes only the affinities between all the points in $$\hat{S}_k^{t-1} \cup \hat{S}_l^{t-1}$$

to all the points in $$\hat{S}_k^{t-1} \cup \hat{S}_l^{t-1},$$

is denoted by $\hat{P}_{kl}^{t-1}$. This local affinity sub-matrix is raised by a power of $2^t$, denoted by $\hat{Q}_{kl}^t = \hat{P}_{kl}^{t-1^{2^t}}$, to diffuse the affinities in time. Only the affinities between all the points in both super-LDFs propagate in time. This way, we eliminate distinct relations between them while reducing the noise and increasing the accuracy of the distance metric. $\hat{Q}_{kl}^t$ enables to preserve only local connections. Since we are interested in the diffusion connectivity between two super-LDFs, we need only the sub-matrix $\hat{Q}_{kl}^t$ that includes the affinities between the points in $\hat{S}_k^{t-1}$ to the points in $\hat{S}_l^{t-1}$. We denote this sub-matrix by $\hat{Q}_{kl}^t$.

Last, the affinity $P_{kl}^t$ between the folders $\hat{S}_k^{t-1}$ and is defined by one of the following metrics:

i. Fastest random runner:

$$P_{kl}^t = \max_{1 \le i \le |S_k^{t-1}|} \max_{1 \le j \le |S_l^{t-1}|} \hat{Q}_{kl_{ij}}^t.$$

This metric expresses the fastest path between the two super-LDFs which is determined by the application of multiple random walks between the two super-LDFs.

ii. Slowest random runner:

$$P_{kl}^t = \min_{1 \le i \le |S_k^{t-1}|} \min_{1 \le j \le |S_l^{t-1}|} \hat{Q}_{kl_{ij}}^t.$$

This metric expresses the slowest path between two super-LDFs.

iii. Average random runner:

$$P_{kl}^t = \frac{\sum_{i=1}^{|\hat{S}_k^{t-1}|} \sum_{j=1}^{|\hat{S}_l^{t-1}|} \hat{Q}_{kl_{ij}}^t}{|\hat{S}_k^{t-1}||\hat{S}_l^{t-1}|}.$$

This metric expresses the average path between two super-LDFs.

At the end of this process, $P^t$ is a non-negative and symmetric matrix that includes the pair-wise distances between any pair of super-LDFs. The size of $P^t$ is $|\hat{S}^{t-1}||\hat{S}^{t-1}|$. $P^t$ is normalized into a Markov transition matrix (normalized graph Laplacian or Laplace-Beltrami normalization) as described in 1 e. $P^t$ is the folder LAM between the super-LDFs of the bottom-level (t−1) in the hierarchy.

c. Construction of a super-LDF

The rest of the process which constructs the top level of the given time-step is similar to the construction of the bottom level described above with reference to steps 1302-1306 in FIG. 13 and step 1108 in FIG. 11b. In other words, section (2) of the algorithm above titled "Construction of the bottom level of the hierarchy at $t \ge 1$" is executed here for t>1. However, the input data for this process is the set of folders of LDFs $\hat{S}^{t-1}$ (instead of the set of points as in the bottom level) and the initial local affinity for this process is the folder LAM $P^t$ between the LDFs in the bottom level $\hat{S}^{t-1}$ of the current level. Therefore, in this level, we cluster folders and not points. At the end of this construction of each top level, a higher-level partition (clustering) $\hat{S}^t$ of the data into super-LDFs is achieved. These LDFs are the input for the next top level (t+1). In addition, the final folder LAM $P^t$ constructed in this process is the input affinity matrix for the next top level (t+1).

Experimental Results

The hierarchical clustering method disclosed herein was tested on several datasets that belong to different domains:

1. Network protocol dataset—clustering and classification of network packets;
2. Wine dataset—wine recognition and classification;
3. Iris dataset—clustering of iris plants;
4. Image processing—de-noising and reconstruction of images.

The Network Protocols Dataset

Figure 14:
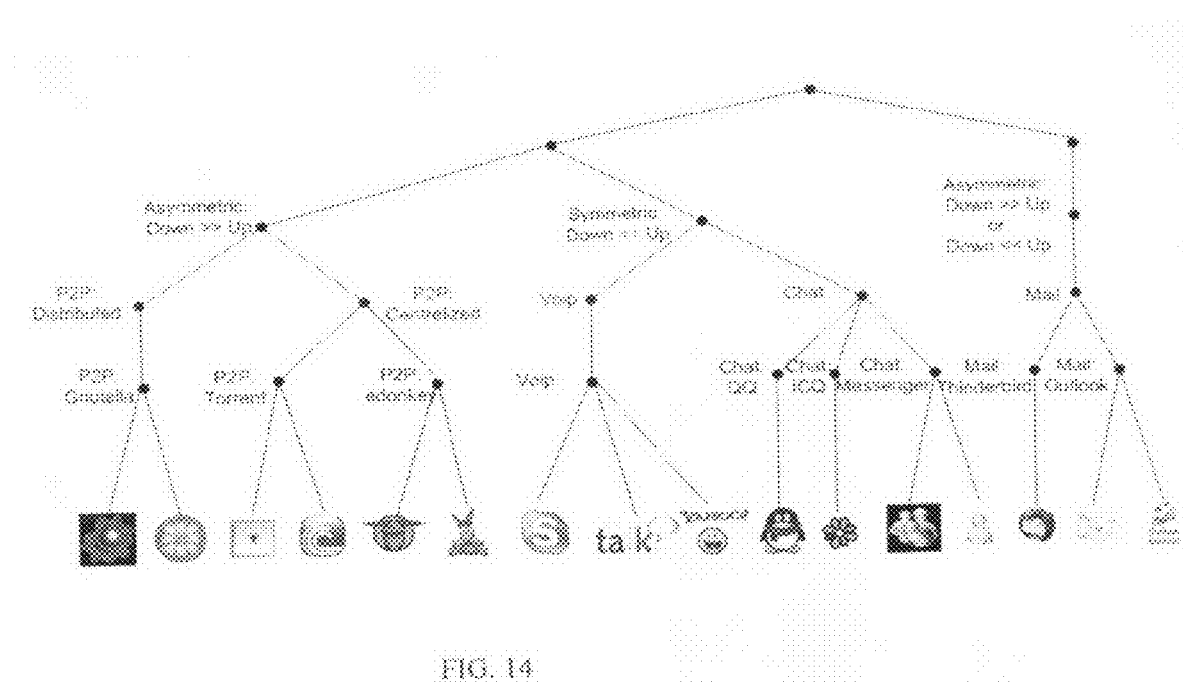
FIG. 14 shows a possible hierarchy of network applications.

FIG. 14 shows a possible hierarchy of network applications. In this example, a dataset includes records of network activities of different applications (for example, Skype, Google Talk, ICQ, Windows Messenger, Microsoft Outlook, Mozila Thunderbird, Limewire, Gnucelus, eMule, eDonkey2000, BitLord, uTorrent, etc.). Each record includes the numerical statistics of a single network activity (for example a single chat) of a single application. In this application, the records are the data points. The statistics include 30 parameters ("features") for each record. These features may include the duration of the activity, the number of bytes the client sent to the server and received from the server, the upload and download bit rate, the number of data packets and control packets, etc.

The dataset used for the experimental evaluation included 5,500 records, where each record belonged to one of 17 applications. In the bottom levels of the hierarchy, the records should be clustered according to their applications and meta-applications (for example, Windows Messenger and Windows Live Messenger). In the top levels of the hierarchy, the records should be clustered according to their protocols (for example, chat, VOIP, etc.) and their meta-protocols (for example, symmetric and asymmetric communication). FIG. 14 shows a diagram of a possible hierarchy of such a dataset.

In order to evaluate the quality of the clustering produced by our method, we compared its performance to the performance of several other clustering algorithms and methods. We measured the quality and the accuracy of the clustering algorithms as follows: Let $X=\{x_1, \ldots, x_m\}$ be a set of n-dimensional points in n where each point $x_i \in X$ is described by n variables $x_i = \{hx_i^1, \ldots, x_i^n\}$. Let $L=\{l_1, \ldots, l_q\}$ be a set of different classes. For each n-dimensional point $x_i \in X$, the corresponding label $y_i, y_i = l_j, j=1, \ldots, q$ is assigned. Therefore, $Y=\{y_1, \ldots y_m\}$ is a set of labels for the dataset X. Y is used only for measuring the quality of the clustering algorithms and not for the clustering process itself.

Let f be a clustering algorithm to be evaluated. Let k be the number of clusters that f generates. Then, $f_k$ is a clustering algorithm which associates each $x_i \in X, i=1, \ldots, m$, to one of the clusters $c_r \in C, r=1, \ldots, k$, where k is the number of clusters in C. Each $c_r \in C$ is labeled according to the majority of the records in the cluster. Formally, let $B_{C_r}^i = \Sigma_{x_p \in c_r} \delta(x_p, l_i)$, where $$\delta(x_p, l_i) = \begin{cases} 1 & \text{if } y_p = l_i \\ 0 & \text{otherwise} \end{cases} \text{ and } i=1, \ldots, q, r=1, \ldots, k.$$

Then, the label of each cluster $c_r \in C, r=1, \ldots, k$, is denoted by $M_{c_r} = \{l_i : \max_{1 \le i \le q} B_{c_r}^i\}$.

In order to evaluate the quality of the clustering algorithms, we measured the number of records in each cluster whose labels are equal to the label of the majority of the records in the cluster, where the majority of the records is at least P % from the total number of records in the cluster. This measure determines the purity of the cluster (the intra-cluster accuracy). This P-purity accuracy is defined by:

$$OP_k^p = \frac{\sum_{r=1}^k M_{c_r}}{k} = \frac{\sum_{r=1}^k \max_{1 \le i \le q} B_{c_r}^{i,p}}{k}$$

where k is the total number of clusters and $$B_c^{ip} = \begin{cases} 1 & \text{if} & \frac{B_{c_r}^i \cdot 100}{|c_r|} > P \\ 0 & \text{otherwise} \end{cases}.$$

Figure 15:
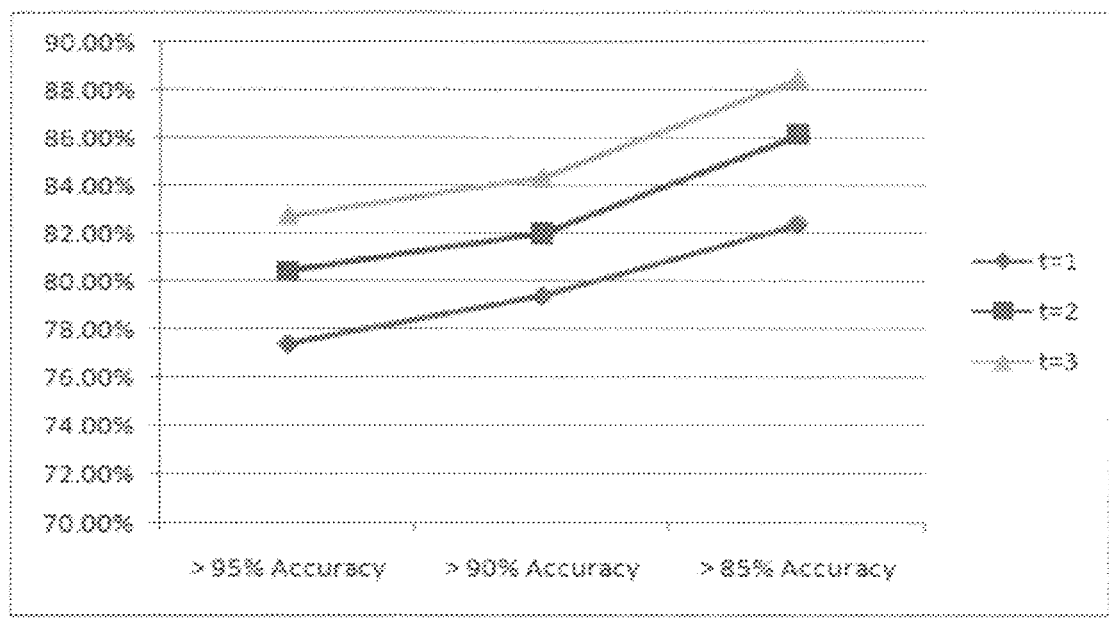
FIG. 15 shows a comparison between inter-cluster accuracy results for different t values in the network application example of FIG. 14.
Figure 16:
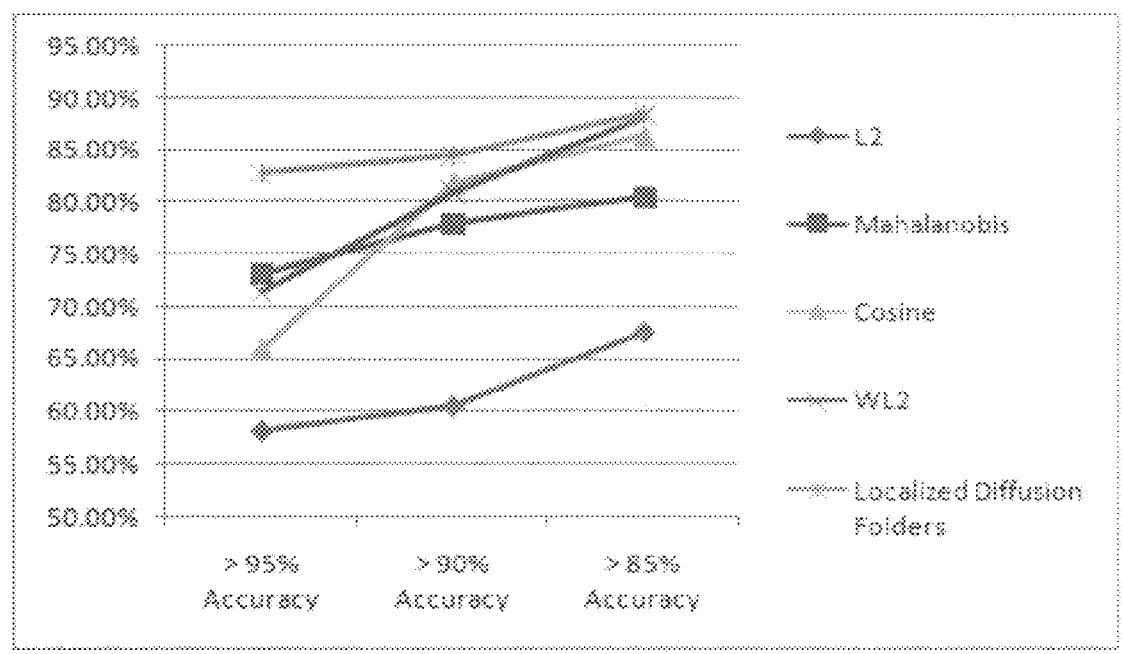
FIG. 16 shows a comparison, in the network application example of FIG. 14, between the inter-cluster accuracy results from the diffusion maps and from the LDF algorithm where the distances are Euclidean ($L_2$), Mahalanobis, Cosine and Weighted Euclidean ($WL_2$)
Figure 17:
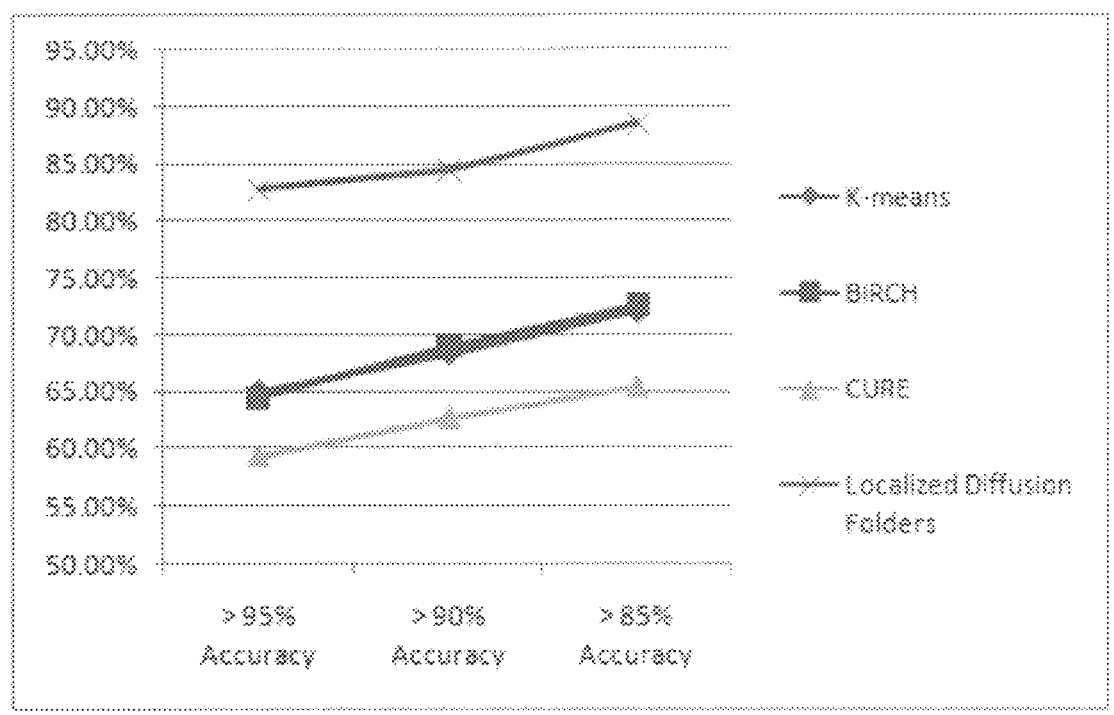
FIG. 17 shows a comparison, in the network application example of FIG. 14, between the inter-cluster accuracy results from the k-means, BIRCH, CURE and LDF algoriths.

In FIGS. 15-17, described next, the X-axis represents the different P-purity levels and the Y-axis represents the percentages of the clusters that gained these levels.

First, we analyze the affect of t on the quality of the clustering. FIG. 15 shows the comparison between the P-purity results from the LDF algorithm when t=1, 2, 3 (first, second and third time steps which are also first, second and third levels in the hierarchy of the folders, respectively). As t increases, the accuracy improves accordingly. The reason is that at the bottom of the hierarchy (t=1) we still have some clustering errors and as a result the accuracy of some folders is relatively low. However, as t=1 increases and folders are merged by this method, the clustering errors become negligible and the overall accuracy improves. This is the expected behavior of the LDF methodology. Since our method aims to improve the clustering via the application of the diffusion maps, we compare results obtained using the LDF algorithm and those obtained using a diffusion maps algorithm. We applied the diffusion maps to the data and we clustered the points in the embedding. In order to evaluate the diffusion maps using kernels constructed according to different distance metrics, we used the Euclidean ($L_2$), Mahalanobis, Cosine and Weighted Euclidean (WL2) distances.

FIG. 16 shows the comparison between the P-purity results from the LDF algorithm and the diffusion maps (using different distance metrics). We see that for 95%-Purity, the LDF algorithm is more accurate than the best diffusion maps results by about 15%. For 90%-Purity, the LDF algorithm is more accurate by about 5% and for 85%-Purity we get about the same results. This means that the LDF algorithm generates more accurate and purer clusters. Last, we compared the accuracy of the LDF algorithm to the accuracy of k-means, BIRCH, and CURE clustering algorithms. FIG. 17 shows the comparison between the P-purity results from the LDF algorithm and the different clustering algorithms. We can see that the LDF algorithm outperforms the other clustering algorithms while achieving the best results for different P-purity levels.

The Wine Dataset

This dataset is described in Blake and Merz, "UCI Repository of Machine Learning Databases". Dept. of Information and Computer Science, U.C. Irvine, Irvine, Calif., USA, 1998. It is a result of the chemical analysis of wines grown in the same region in Italy but derived from three different cultivars. The analysis determined the quantities of 13 constituents found in each of the three types of wines. Therefore, each data point is a vector including the 13 parameters: alcohol, malic acid, ash, alkalinity ash, Magnesium, total phenols, flavanoids, non-flavanoid phenols, Proanthocyanins, color intensity, hue, OD280/OD315 of diluted wines and Proline. The dataset includes 178 wines which belong to three classes (types): 59 wines belong to class 1, 71 wines belong to class 2 and 48 wines belong to class 3. In this experiment, an affinity matrix between wines was constructed according to the Euclidean distance of the log value of each wine. Then we constructed the hierarchical LDFs accordingly. In the bottom level of the hierarchy (t=1) we had 22 LDFs. In the second level (t=2) we had 10 LDFs. In the third level (t=3) we had 7 LDFs and in the fourth level (t=4) we had 5 LDFs. We measured the overall accuracy in each level as follows: each LDF was labeled according to the majority of the points that have the same label. The overall accuracy is the ratio between the total number of points that have the same label as the majority (in their LDF) and the total number of points in the dataset. We compared the overall accuracy of the LDF algorithm to the accuracy of k-means and BIRCH clustering algorithms. The overall accuracy of each algorithm was evaluated for the different number of clusters (22, 10, 7 and 5).

Figure 18:
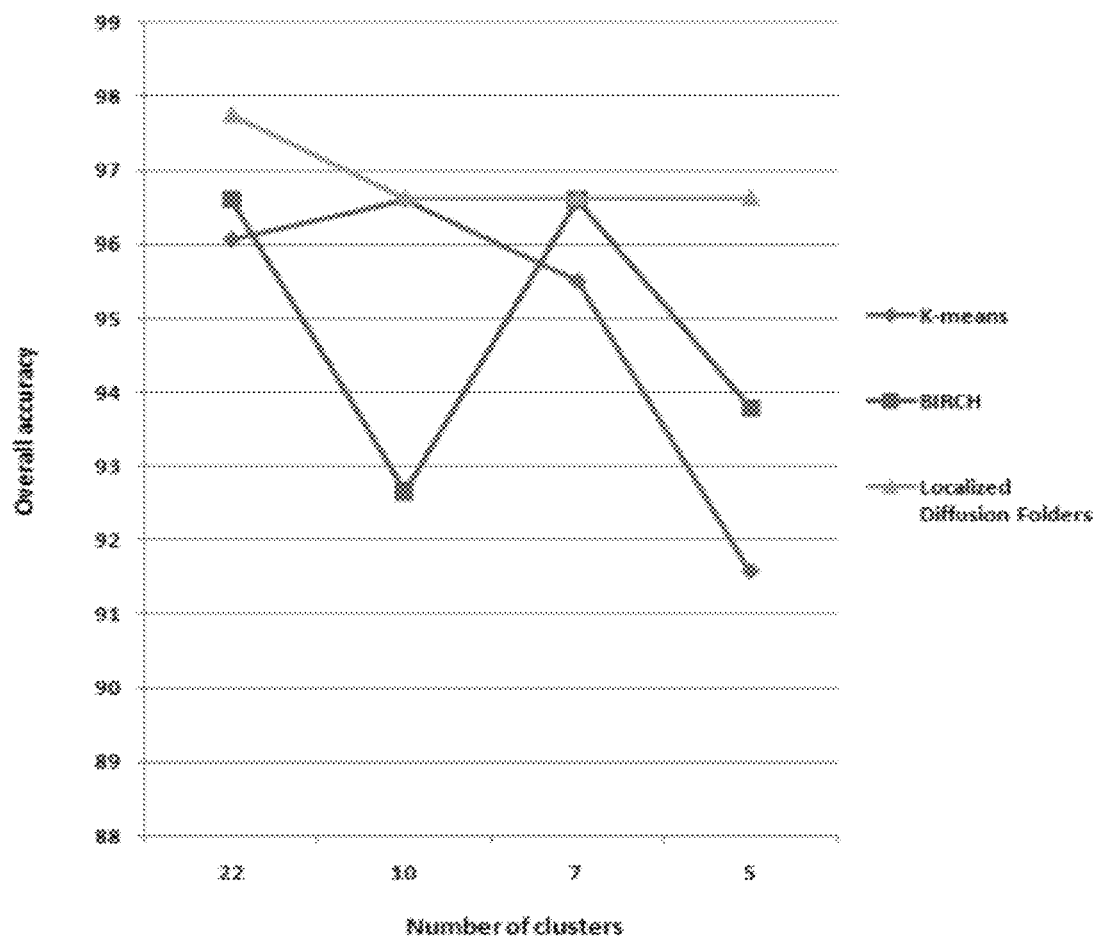
FIG. 18 shows a comparison, for the wine dataset example, between the overall accuracy results from the k-means, BIRCH, CURE and LDF algorithms.

FIG. 18 shows the comparison results. The X-axis in this figure represents different number of clusters and the Y-axis represents the overall accuracy. We see that for 22 LDFs (t=1 in the LDF algorithm), the LDF algorithm is more accurate than BIRCH by 1.1% and than k-means by 1.8%. For 10 clusters (t=2 in the LDF algorithm), the LDF algorithm is more accurate than BIRCH and as accurate as k-means. For 7 LDFs (t=3 in the LDF algorithm), the LDF algorithm is more accurate than k-means and as accurate as BIRCH. For 5 LDFs (t=4 in the LDF algorithm), the LDF algorithm is more accurate than BIRCH by 3.1% and than k-means by 5.7%. For this dataset, the overall accuracy of the LDF algorithm was better than that of the compared-to algorithms.

The Iris Dataset

The iris dataset is described in R. A. Fisher, "The use of multiple measurements in taxonomic problems", Annual Eugenics, vol. 7(2), pages 179-188, 1936. This is well known dataset which may be found in the pattern recognition literature. It includes information about three types of iris plants. The plants are described by four variables (sepal length and width and petal length and width given in cm). Therefore, in this example, a data point is a vector including the four variables. The dataset includes 3 classes of 50 instances each, where each class refers to a type of iris plant (Setosa, Versicolour, and Virginica). One class is linearly separable from the other two. The latter two are not linearly separable from each other. We added Gaussian noise to the original iris dataset in order to determine its effect on different clustering algorithms. We measured the overall accuracy as described in the section on the wine dataset. We compared the accuracy of the LDF algorithm to the accuracy of k-means, CURE and BIRCH clustering algorithms. Table 1 shows the comparison results. For each clustering algorithm, we measured the worst overall accuracy and the best overall accuracy.

TABLE 1

| Algorithm | Worst accuracy | Best accuracy |
|---|---|---|
| LDF | 84.21 | 90.13 |
| BIRCH | 66.25 | 89.35 |
| CURE | 60.74 | 79.74 |
| K-means | 65.79 | 89.40 |

For the worst case, we see that the LDF algorithm is more accurate than BIRCH by 21.35%, than CURE by 27.87% and than k-means by 21.87%. In this case, the BIRCH, CURE and k-means algorithms failed to cluster the noisy dataset. For the best case, we see that the LDF algorithm is more accurate than BIRCH by 0.87%, than CURE by 11.53% and than k-means by 0.81%. For this noisy dataset, the overall accuracy of the LDF algorithm was better than that of the compared-to algorithms.

De-Noising and Restoration of Images

Image de-noising and restoration are two important application topics in image processing. We used the LDF algorithm for de-noising and restoration of images as follows: first, we represented each pixel in the image by a window of 5×5 neighbors around it. This way, each pixel, which is a data point, is transformed into a 25-dimensional vector (megapixel). Then, we moved with a sliding window of 9×9 megapixels over the image in order to determine the value of the center pixel of each sliding window. For each sliding window, we applied the following process: first, we constructed the hierarchical LDF according to the 9×9 neighbors around it. This way, each such window of 81 pixels was clustered into LDFs of pixels, super-LDFs (meta-pixels), super-super-LDFs (meta-metapixels), etc. Last, we replaced the value of the center pixel (in the 9×9 window) with the average value of the pixels in the largest meta-pixel in the third level of the hierarchy.

A method for de-noising using diffusion processes on graphs was described in A. Szlam, M. Maggioni and R. Coifman, "A general framework for adaptive regularization based on diffusion processes on graphs", Technical Report YALE/DCS/TR1365, Yale University, July 2006, denoted as SMC. Since our LDF method is most related to this diffusion regularization method, we compare between the performance of both methods.

Figures 19A, 19B, 19C, 19D, 19E, 19F:
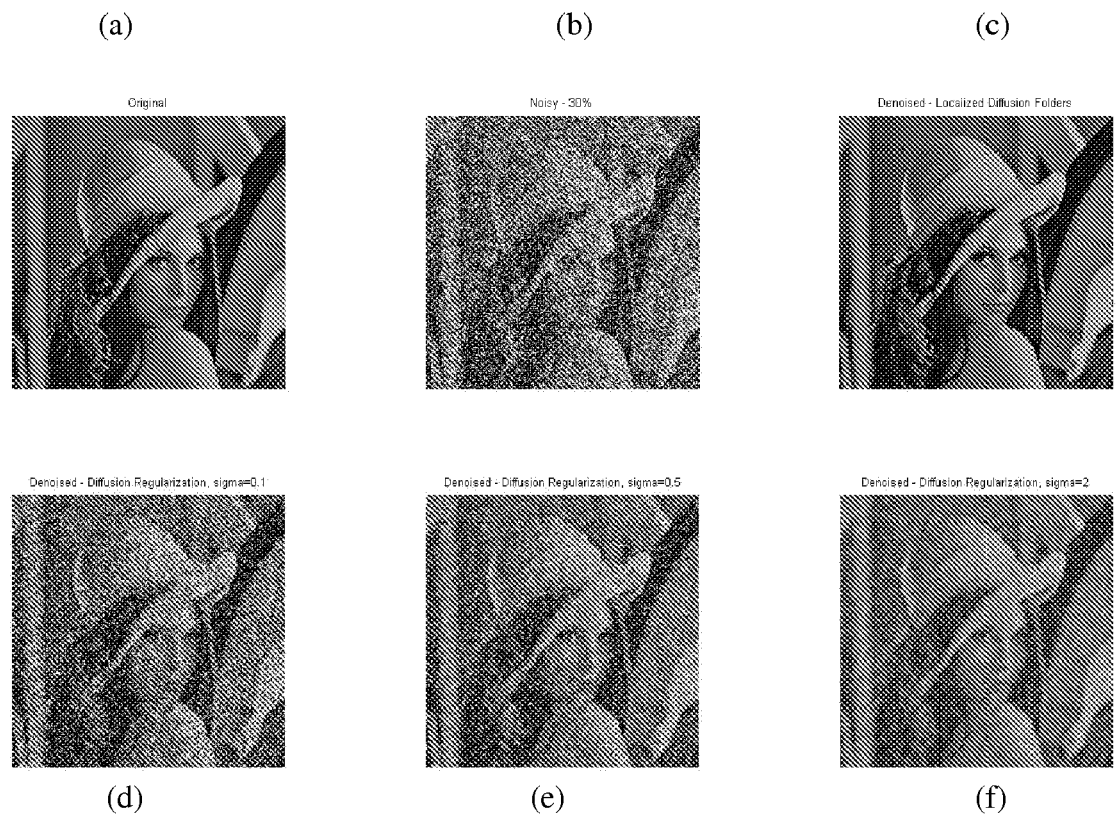
FIG. 19 shows a comparison, in the image de-noising example, between the de-noising results of the LDF algorithm and the diffusion regularization results: (a) the original image, (b) image (a) was added with 30% noise, (c) de-noised by using the application of LDF algorithm, (d) de-noised by diffusion regularization with $\sigma=0.1$, (e) de-noised by diffusion regularization with $\sigma=0.5$. and (f) de-noised by diffusion regularization with $\sigma=2$.

FIG. 19 shows a comparison, in the image de-noising example, between the de-noising results of the LDF algorithm and the diffusion regularization results: (a) the original image. Image (b) shows image (a) added with 30% noise. We used salt & pepper noise, where 30% of the original pixels were replaced by salt (white) or pepper (black). (c) shows the image de-noised by using the application of the LDF algorithm. (d), (e) and (f) show the results of the diffusion regularization algorithm using different σ (scale controls) values while constructing the Gaussian kernel (as described in SMC). (d) shows the image de-noised with σ=0.1, (e) de-noised by with σ=0.5. and (f) de-noised with σ=2. As we can see, the LDF algorithm achieves the best de-noising results.

Figures 20A, 20B, 20C:
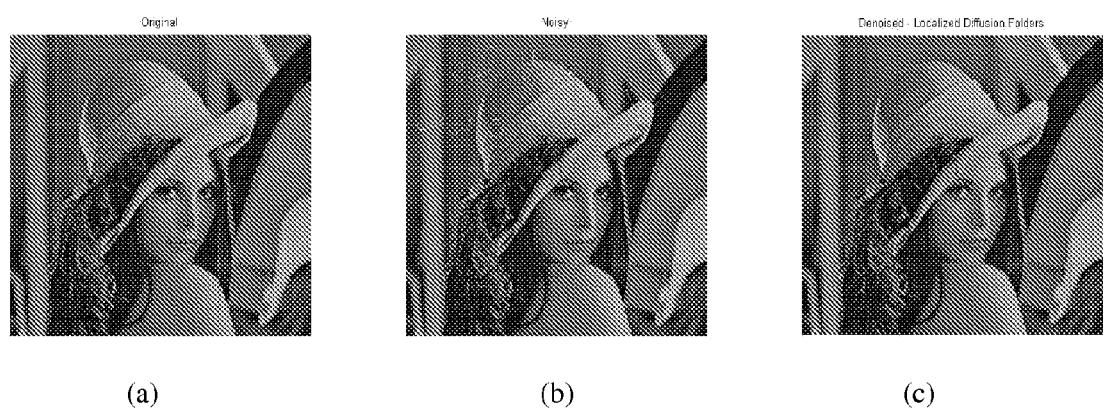
FIG. 20 shows image restoration example: (a) the original image, (b) image (a) noised by adding marks of lines on it and (c) de-noised by using the LDF algorithm.

FIG. 20 shows another image processing result. This result relates to the image restoration problem. Image (a) is the original image. Image (b) is the damaged image. Image (c) is the result of the LDF de-noising algorithm (as described above). As we can see, the LDF algorithm restored the damage image successfully.

Figure 21:
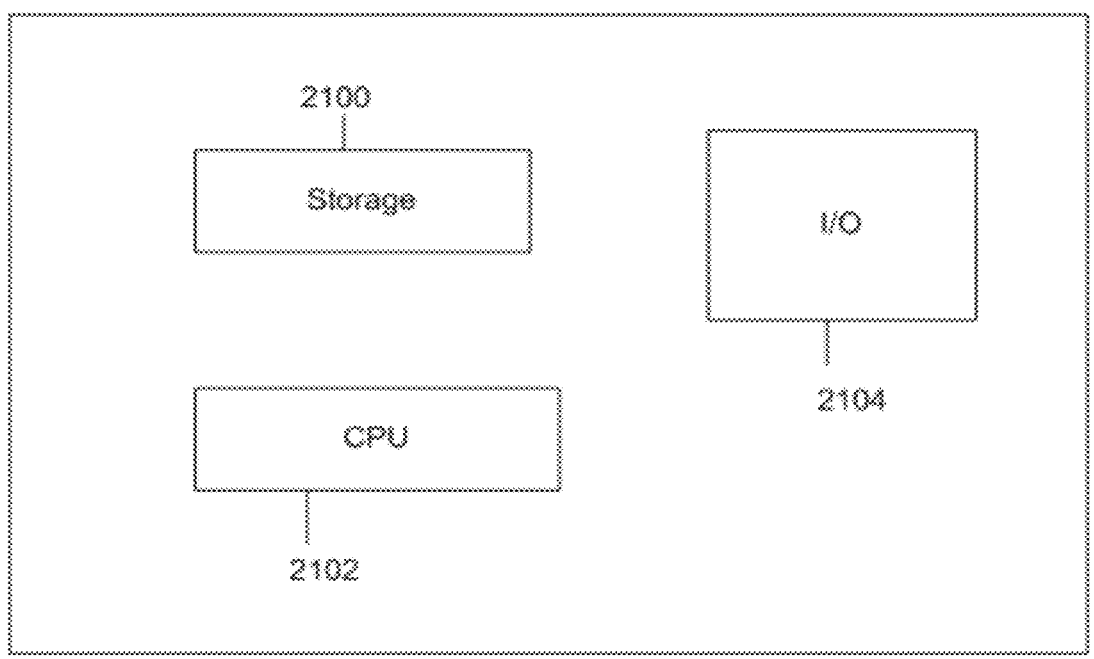
FIG. 21 shows a computer system having a storage area for storing data and a program of instructions executable by a central processing unit from the data input by an input/output component, for performing the method of the present invention.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein. For example, any digital computer system can be configured or otherwise programmed to implement the methods disclosed herein, and to the extent that a particular digital computer system is configured to implement the methods of this invention, it is within the scope and spirit of the present invention. FIG. 21 shows such a computer system having a storage area 2100 for storing data and a program of instructions, executable by a central processing unit (CPU 2101) from the data input by an input/output component (I/O 2104), for performing the method of the present invention.

Once a digital computer system is programmed to perform particular functions pursuant to computer-executable instructions from program software that implements the present invention, it in effect becomes a special purpose computer particular to the present invention. The techniques necessary to achieve this are well known to those skilled in the art and thus are not further described herein. When such a program of instructions is to be executed, it is usually loaded into the random access memory of the computer, thereby configuring the computer to act in accordance with the techniques disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the present invention.

Accordingly, drawings, tables, and description disclosed herein illustrate technologies related to the invention, show examples of the invention, and provide examples of using the invention and are not to be construed as limiting the present invention. Known methods, techniques, or systems may be discussed without giving details, so to avoid obscuring the principles of the invention. As it will be appreciated by one of ordinary skill in the art, the present invention can be implemented, modified, or otherwise altered without departing from the principles and spirit of the present invention. Therefore, the scope of the present invention should be determined by the following claims and their legal equivalents.

All patents, patent applications and publications mentioned in this specification are herein incorporated in their entirety by reference into the specification, to the same extent as if each individual patent, patent application or publication was specifically and individually indicated to be incorporated herein by reference. In addition, citation or identification of any reference in this application shall not be construed as an admission that such reference is available as prior art to the present invention.

The invention claimed is:

1. A method of hierarchical clustering of multi-dimensional data which includes a plurality of data points, the method comprising the steps of:
   a) at a lowest level in a hierarchical clustering structure, partitioning the data points into at least two sets of non-overlapping local diffusion folders (LDFs); and
   b) at a higher level in the hierarchical clustering structure, processing all LDFs in the sets into at least one super-LDF, wherein each super-LDF represents a cluster.

2. The method of claim 1, wherein the step of partitioning includes constructing an initial local affinity matrix (LAM) which is further used to construct a respective set of non-overlapping LDFs.

3. The method of claim 2, wherein the constructing an initial LAM includes processing the plurality of data points into a Markov transition matrix.

4. The method of claim 3, wherein the constructing a Markov transition affinity matrix includes:
   i. building a matrix C of size m×n of data points, where m is the number of data points and n is the number of features in each data point,
   ii. normalizing matrix C to obtain a normalized matrix A,
   iii. processing normalized matrix A to construct a similarity matrix Ã,
   iv. processing similarity matrix Ã to construct a Gaussian kernel K, and
   v. normalizing the Gaussian kernel K into the Markov transition matrix.

5. The method of claim 1, wherein the step of processing all LDFs includes:
   i. using all LDFs obtained in step (a) to construct a folder LAM, and
   ii. using the folder LAM to construct the at least one super-LDF.

6. The method of claim 1, further comprising the step of:
c) checking whether the at least one super-LDF is a single super-LDF and if not, processing all super-LDFs into a single root super-LDF.

7. The method of claim 1, wherein the constructing a respective set of non-overlapping LDFs includes:
   i. randomly selecting an initial data point,
   ii. building a diffusion folder around the initial data point, and
   iii. repeating (i) and (ii) with different randomly selected initial data points to construct a Voronoi diagram of LDFs.

8. The method of claim 1, wherein a data point is a record of a data network activity.

9. The method of claim 1, wherein a data point is a vector of wine constituents.

10. The method of claim 1, wherein a data point is a vector of plant variables.

11. The method of claim 1, wherein a data point is an image pixel.

12. A digital computer system comprising:
a) a storage area for storing multi-dimensional data which includes a plurality of data points; and
b) a program of instructions executable by a central processing unit to perform steps of:
   i. at a lowest level in a hierarchical clustering structure, partitioning the data points into at least two sets of non-overlapping local diffusion folders (LDFs) and,
   ii. at a higher level in the hierarchical clustering structure, processing all LDFs in the sets into at least one super-LDF, wherein each super-LDF represents a respective cluster.

13. The method of claim 12, wherein the step of partitioning includes constructing an initial local affinity matrix (LAM) which is further used to construct a respective set of non-overlapping LDFs.

14. The system of claim 13, wherein the constructing an initial LAM includes processing the plurality of data points into a Markov transition matrix.

15. The system of claim 14, wherein the constructing a Markov transition affinity matrix includes:
   i. building a matrix C of size m×n of data points, where m is the number of data points and n is the number of features in each data point,
   ii. normalizing matrix C to obtain a normalized matrix A,
   iii. processing normalized matrix A to construct a similarity matrix $\tilde{A}$,
   iv. processing similarity matrix $\tilde{A}$ to construct a Gaussian kernel K, and
   v. normalizing the Gaussian kernel K into the Markov transition matrix.

16. The system of claim 12, wherein the step of processing all LDFs includes:
   A. using all LOPS obtained in step (a) to construct to folder LAM, and
   B. using the folder LAM to construct the at least one super-LDF.

17. The system of claim 12, further comprising the step of:
   iii. checking whether the at least one super-LDF is a single super-LDF and if not, processing all super-LDFs into a single root super-LDF.

18. The system of claim 13, wherein the constructing a respective set of non-overlapping LDFs includes:
   A. randomly selecting an initial data point,
   B. building a diffusion folder around the initial data point, and
   C. repeating (A) and (B) with different randomly selected initial data points to construct a Voronoi diagram of LDFs.

19. The system of claim 12, wherein a data point is selected from the group consisting of a record of a data network activity, a vector of wine constituents, a vector of plant variables and an image pixel.

* * * * *